US012608272B2

(12) United States Patent
Nakamura

(10) Patent No.: US 12,608,272 B2
(45) Date of Patent: Apr. 21, 2026

(54) MEMORY CONTROLLER AND MEMORY SYSTEM

(71) Applicant: Kioxia Corporation, Tokyo (JP)

(72) Inventor: Masaki Nakamura, Fujisawa Kanagawa (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/743,554

(22) Filed: Jun. 14, 2024

(65) Prior Publication Data

US 2024/0419536 A1 Dec. 19, 2024

(30) Foreign Application Priority Data

Jun. 16, 2023 (JP) ................................. 2023-099202

(51) Int. Cl.
*G06F 11/10* (2006.01)
(52) U.S. Cl.
CPC ...... *G06F 11/1004* (2013.01); *G06F 11/1068* (2013.01)
(58) Field of Classification Search
None
See application file for complete search history.

(56) References Cited

U.S. PATENT DOCUMENTS

| | | | |
|---|---|---|---|
| 2002/0196883 A1* | 12/2002 | Best ...................... | H03L 7/0814 375/355 |
| 2003/0088834 A1* | 5/2003 | Murakami .............. | H03L 7/091 360/39 |
| 2009/0327836 A1* | 12/2009 | Shimizu ............ | H03M 13/3905 714/752 |
| 2010/0169734 A1* | 7/2010 | Gamage ............. | H03M 13/1105 714/752 |
| 2016/0055057 A1* | 2/2016 | Shin ..................... | G06F 11/1012 714/764 |
| 2019/0087264 A1* | 3/2019 | Tokutomi .......... | H03M 13/6505 |
| 2019/0295635 A1* | 9/2019 | Kiyooka ................ | G11C 16/26 |
| 2021/0211142 A1 | 7/2021 | Hyodo et al. | |
| 2021/0271615 A1* | 9/2021 | Yamamoto .......... | G06F 13/1689 |
| 2022/0012124 A1* | 1/2022 | Zhang ................. | G11C 11/5642 |
| 2025/0006262 A1* | 1/2025 | Zhou ...................... | G11C 16/26 |

FOREIGN PATENT DOCUMENTS

JP 2021-111826 A 8/2021

OTHER PUBLICATIONS

Z. Fang, Z. Ma, X. Tang, Y. Xiao and Y. Tang, "Program error mitigation in MLC NAND flash memory with soft decision decoders," in China Communications, vol. 18, No. 4, pp. 76-87, Apr. 2021, (Year: 2021).*

* cited by examiner

*Primary Examiner* — Daniel F. McMahon
(74) *Attorney, Agent, or Firm* — Kim & Stewart LLP

(57) ABSTRACT

A memory controller includes a memory interface circuit, a memory device, and an error correction circuit. The memory interface circuit receives, during a read operation executed in a semiconductor memory device, a data signal from the semiconductor memory device to acquire the data from the data signal. The error correction circuit is configured to store in the memory device likelihood information of the data acquired from the data signal, revise the likelihood information of the data acquired from the data signal, and perform an error correction process on the data based on the revised likelihood information.

6 Claims, 17 Drawing Sheets

Figure 8:
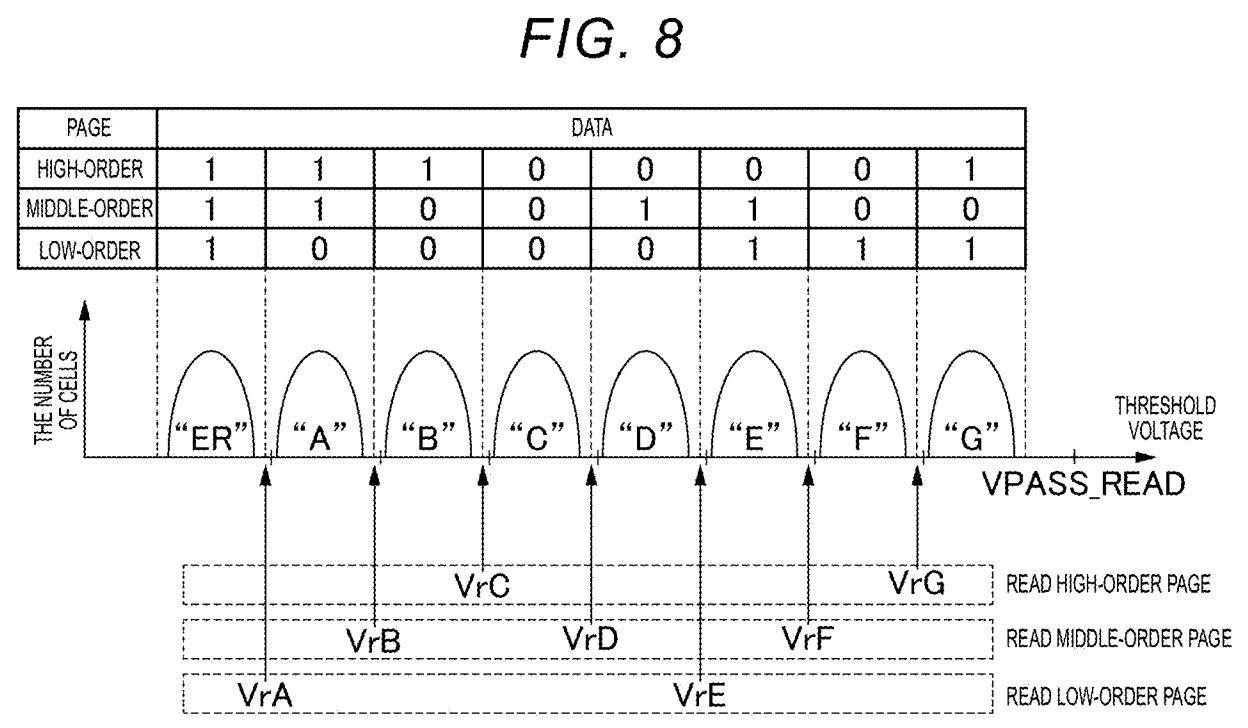

| PAGE | "ER" | "A" | "B" | "C" | "D" | "E" | "F" | "G" |
|---|---|---|---|---|---|---|---|---|
| HIGH-ORDER | 1 | 1 | 1 | 0 | 0 | 0 | 0 | 1 |
| MIDDLE-ORDER | 1 | 1 | 0 | 0 | 1 | 1 | 0 | 0 |
| LOW-ORDER | 1 | 0 | 0 | 0 | 0 | 1 | 1 | 1 |

DATA

THE NUMBER OF CELLS

THRESHOLD VOLTAGE

VPASS_READ

VrA  VrB  VrC  VrD  VrE  VrF  VrG

READ HIGH-ORDER PAGE

READ MIDDLE-ORDER PAGE

READ LOW-ORDER PAGE

| | d1 | d2 | d3 | d4 | d5 | d6 | d7 | d8 | d9 |
|---|---|---|---|---|---|---|---|---|---|
| READ DATA | 0 | 0 | 0 | 0 | 1 | 0 | 1 | 1 | 0 |
| BASIC LIKELIHOOD INFORMATION PLb | 90 | 90 | 90 | 90 | 90 | 90 | 90 | 90 | 90 |
| FIRST REVISION VALUE ΔPL1 | 0 | −1 | −2 | −3 | 0 | 0 | 0 | −1 | 0 |
| SECOND REVISION VALUE ΔPL2 | 0 | −1 | 0 | −1 | 0 | −1 | 0 | −1 | 0 |
| THIRD REVISION VALUE ΔPL3 | −1 | −1 | −1 | −1 | +1 | −1 | +1 | +1 | −1 |
| LIKELIHOOD INFORMATION PL | 89 | 87 | 87 | 85 | 91 | 88 | 91 | 89 | 89 |

MEMORY CONTROLLER AND MEMORY SYSTEM

CROSS-REFERENCE TO RELATED APPLICATION(S)

This application is based upon and claims the benefit of priority from Japanese Patent Application No. 2023-099202, filed Jun. 16, 2023, the entire contents of which are incorporated herein by reference.

FIELD

Embodiments described herein relate generally to a memory controller and a memory system.

BACKGROUND

A memory controller that detects an error in data read from a non-volatile memory and corrects the error is known.

DESCRIPTION OF THE DRAWINGS

FIG. 2 is a block diagram showing a schematic configuration of the memory system according to the embodiment.

FIG. 5 is a block diagram showing a schematic configuration of a semiconductor memory device according to the embodiment.

FIG. 8 is a diagram schematically showing a threshold voltage distribution of a memory cell transistor according to the embodiment.

FIG. 14 is a circuit diagram showing a configuration of the memory system according to the embodiment.

FIG. 16 is a diagram showing an example of a revision process of likelihood information executed by a likelihood information revision unit according to the embodiment.

DETAILED DESCRIPTION

Embodiments provide a memory controller and a memory system capable of enhancing a function of correcting an error included in data.

In general, according to one embodiment, a memory controller includes a memory interface circuit, a memory device and an error correction circuit. The memory interface circuit receives, during a read operation executed in a semiconductor memory device, a data signal from the semiconductor memory device to acquire the data from the data signal. The error correction circuit is configured to store in the memory device likelihood information of the data acquired from the data signal, revise the likelihood information of the data acquired from the data signal, and perform an error correction process on the data based on the revised likelihood information.

In general, according to one embodiment, a memory system includes a semiconductor memory device and a memory controller including a memory interface circuit, a memory device, and an error correction circuit. The memory interface circuit receives, during a read operation executed in the semiconductor memory device, a data signal from the semiconductor memory device to acquire the data from the data signal. The error correction circuit is configured to store in the memory device likelihood information of the data acquired from the data signal, revise the likelihood information of the data acquired from the data signal, and perform an error correction process on the data based on the revised likelihood information.

Hereinafter, embodiments will be described with reference to the drawings. In order to facilitate understanding of the description, the same configuration elements will be denoted by the same reference label as much as possible in each drawing, and duplicate description will be omitted.

1 Embodiment

A memory system according to the embodiment will be described. First, a schematic configuration of the memory system according to the present embodiment will be described.

1.1 Configuration of Memory System

Figure 1:
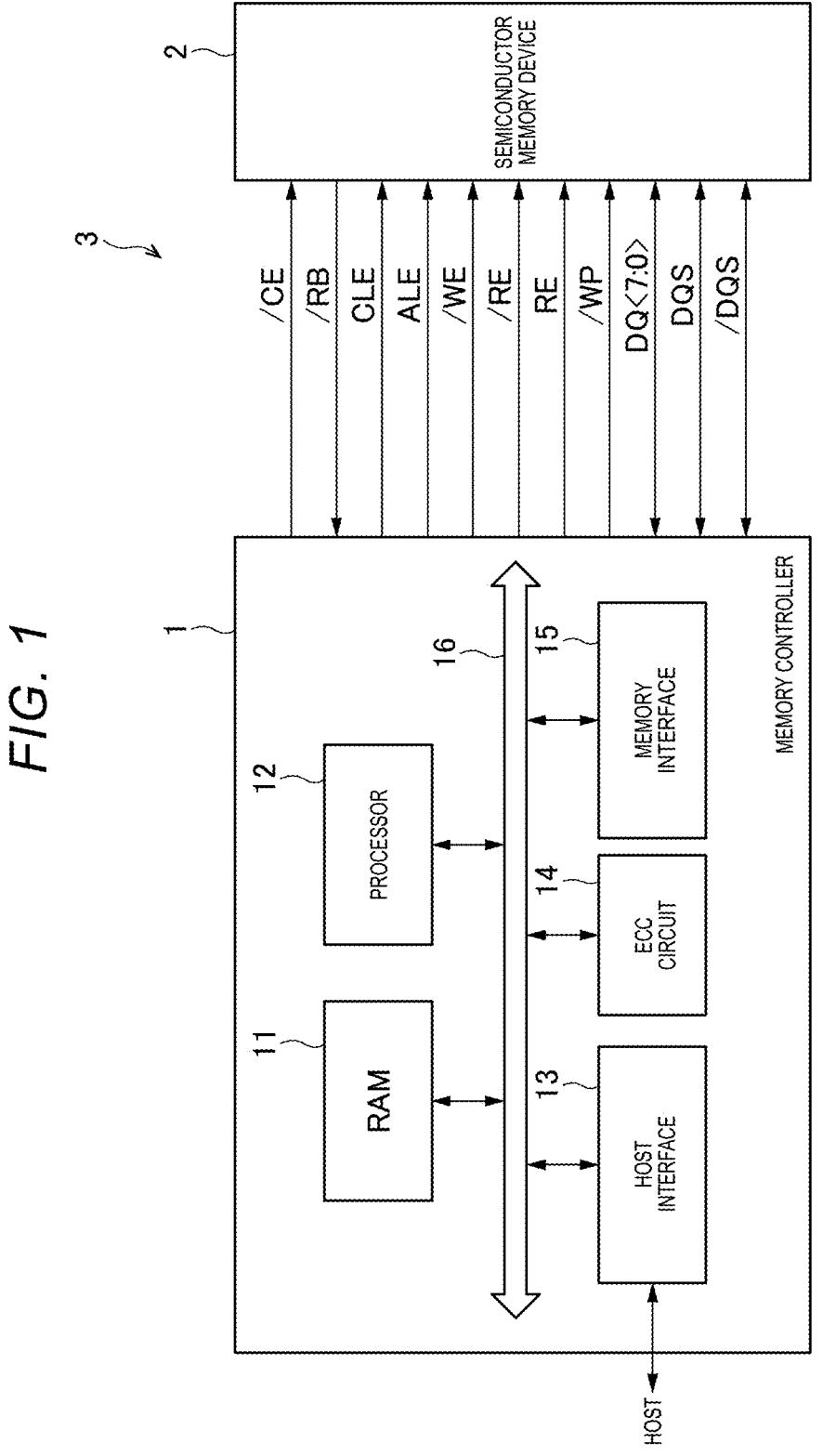
FIG. 1 is a block diagram showing a schematic configuration of a memory system according to an embodiment.

As shown in FIG. 1, a memory system 3 according to the present embodiment includes a memory controller (embodied, e.g., as a controller chip) 1 and a semiconductor memory device (embodied, e.g., as a memory chip) 2. The semiconductor memory device 2 is a non-volatile memory device configured as a NAND flash memory. The memory system 3 is connectable to a host. The host is, for example, an electronic device, such as a personal computer or a mobile terminal. It should be noted that only one semiconductor memory device 2 is shown in FIG. 1, but a plurality of semiconductor memory devices 2 are typically provided in an actual memory system 3.

The memory controller 1 controls data writing to the semiconductor memory device 2 in response to a write request from the host. Further, the memory controller 1 controls data reading from the semiconductor memory device 2 in response to a read request from the host. Between the memory controller 1 and the semiconductor memory device 2, signals of a chip enable signal /CE, a ready busy signal /RB, a command latch enable signal CLE, an address latch enable signal ALE, a write enable signal /WE, read enable signals /RE and RE, a write protection signal/WP, a data signal DQ<7:0>, data strobe signals DQS and /DQS are communicated.

The chip enable signal /CE is transmitted from the memory controller 1 to the semiconductor memory device 2. The chip enable signal /CE is a signal for enabling the semiconductor memory device 2. The ready busy signal /RB is transmitted from the semiconductor memory device 2 to the memory controller 1. The ready busy signal /RB is a signal for indicating whether the semiconductor memory device 2 is in a ready state or a busy state. The "ready state" is, for example, a state in which an instruction from the outside can be received. The "busy state" is a state in which the instruction from the outside cannot be received.

Figure 2:
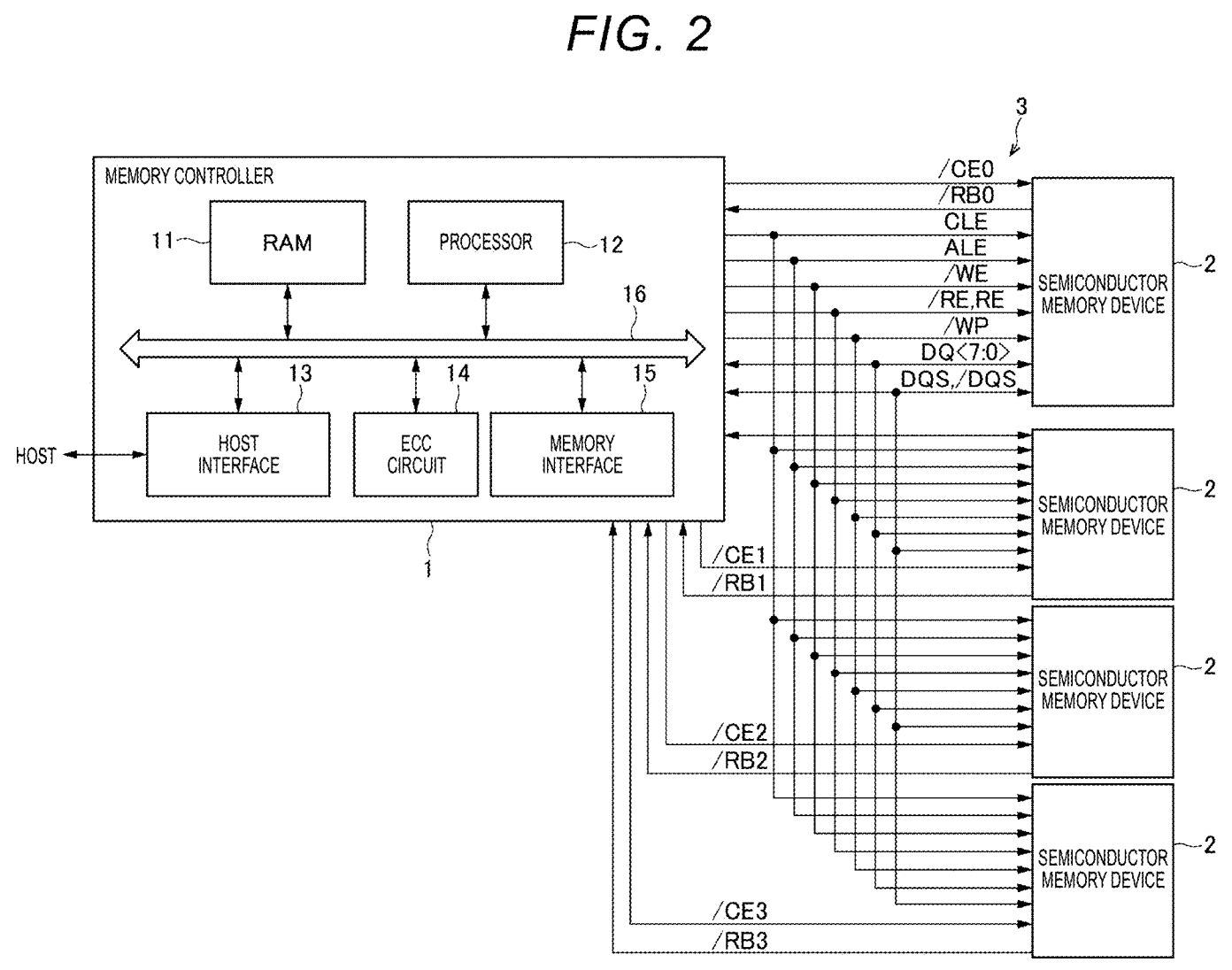

As shown in FIG. 2, the chip enable signals /CE are individually transmitted to each of a plurality of semiconductor memory devices 2. In FIG. 2, each of the chip enable signals /CE is numbered at the end, for example, as "/CE0" such that the chip enable signals /CE are distinguishable from each other. Similarly, the ready busy signals /RB are individually transmitted from each of the plurality of semiconductor memory devices 2. In FIG. 2, each of the ready busy signals /RB is numbered at the end, for example, as "/RB0" such that the ready busy signals /RB are distinguishable from each other.

The signals other than the chip enable signal /CE and the ready busy signal /RB (e.g., command latch enable signal CLE and the like) are communicated between the memory controller 1 and the semiconductor memory device 2 via a signal line common to the plurality of semiconductor memory devices 2. The memory controller 1 uses the individual chip enable signal/CE to specify the semiconductor memory device 2 that is a communication target.

The command latch enable signal CLE is transmitted from the memory controller 1 to the semiconductor memory device 2. The command latch enable signal CLE is a signal indicating that the data signal DQ<7:0> contains a command. The address latch enable signal ALE is transmitted from the memory controller 1 to the semiconductor memory device 2. The address latch enable signal ALE is a signal indicating that the data signal DQ<7:0> contains an address. The write enable signal /WE is transmitted from the memory controller 1 to the semiconductor memory device 2. The write enable signal /WE is a signal for capturing the received signal in the semiconductor memory device 2, and is asserted during the time the memory controller 1 receives the command, the address, or the data. The semiconductor memory device 2 captures the data signal DQ<7:0> at a "low (L)" level in response to a rising edge of the signal/WE.

For example, the semiconductor memory device 2 receives the signal DQ<7:0> as the command in response to the rising edge of the signal /WE in a state in which the signal CLE is at a "high (H)" level and the signal ALE is at the "low (L)" level, and stores the signal DQ<7:0> in a register 24. In addition, the semiconductor memory device 2 receives the signal DQ<7:0> as the address in response to the rising edge of the signal /WE in a state in which the signal CLE is at the "L" level and the signal ALE is at the "H" level, and stores the signal DQ<7:0> in the register 24. Further, in a data-in operation in a single data rate (SDR) mode, the semiconductor memory device 2 receives the signal DQ<7:0> as the data in response to the rising edge of the signal /WE in a state in which the signal CLE is at the "L" level and the signal ALE is at the "L" level, and stores the signal DQ<7:0> in a sense amplifier 28.

The read enable signal /RE is transmitted from the memory controller 1 to the semiconductor memory device 2. The signal RE is a complementary signal to the signal /RE. The read enable signals /RE and RE are signals for the memory controller 1 to read the data from the semiconductor memory device 2. The read enable signals /RE and RE are used, for example, to control an operation timing of the semiconductor memory device 2 when outputting the data signal DQ<7:0>. The data signal DQ<7:0> contains the data communicated between the semiconductor memory device 2 and the memory controller 1, and the data communicated includes the command, the address, and the user data (e.g., read data or write data). The data strobe signal DQS is a timing control signal communicated between the semiconductor memory device 2 and the memory controller 1 in conjunction with the data signal DQ<7:0>. The signal /DQS is a complementary signal to the signal DQS. The data strobe signals DQS and /DQS are signals for controlling an input/output timing of the data signal DQ<7:0>.

For example, in the data-in operation in a double data rate (DDR) mode, the memory controller 1 switches (toggles) the data strobe signals DQS and /DQS between the "L" level and the "H" level while outputting the data signal DQ<7:0>. A phase of the data strobe signal DQS is adjusted such that a rising edge and a falling edge thereof match the center of the data signal DQ<7:0> for one cycle. In other words, in the data-in operation, the data strobe signal DQS and the data signal DQ<7:0> are transmitted from the memory controller 1 to the semiconductor memory device 2 in a state in which the phases thereof are deviated by 90 degrees. The semiconductor memory device 2 receives the signal DQ<7:0> as the data in response to the rising edge and the falling edge of the data strobe signal DQS, and stores the signal DQ<7:0> in the sense amplifier 28.

In a data-out operation in the single data rate mode, the semiconductor memory device 2 outputs the data signal DQ<7:0> to the memory controller 1 in response to the rising edge of the read enable signal /RE. In the data-out operation in the double data rate mode, the memory controller 1 switches (toggles) the read enable signals /RE and RE between the "L" level and the "H" level. The semiconductor memory device 2 outputs the data signal DQ<7:0> to the memory controller 1 while switching (toggling) the data strobe signals DQS and /DQS between the "L" level and the "H" level in response to the rising edge of the read enable signal /RE. The phase of the data strobe signal DQS is adjusted such that the rising edge and the falling edge thereof match the edges of the data signal DQ<7:0> for one cycle.

In the data-out operation in the double data rate mode, the memory interface 15 of the memory controller 1 receives the data signal DQ<7:0> of each cycle at a rising edge timing and a falling edge timing of the signal obtained by deviating the phases of the data strobe signals DQS and /DQS by 90 degrees. The write protection signal /WP is transmitted from the memory controller 1 to the semiconductor memory device 2. The write protection signal /WP is a signal for instructing the semiconductor memory device 2 to prohibit the data writing and the data erasing therein.

The memory controller 1 includes a RAM 11, a processor 12, a host interface 13, an error correcting code (ECC) circuit 14, and a memory interface 15. These components are connected to each other by an internal bus 16. The host interface 13 outputs the requests received from the host, user data (e.g., write data), and the like to the internal bus 16. Further, the host interface 13 transmits the user data read from the semiconductor memory device 2, a response from the processor 12, and the like to the host.

The memory interface 15 controls a process of writing the user data and the like into the semiconductor memory device 2 and a process of reading the user data from the semiconductor memory device 2, based on instructions of the processor 12. The processor 12 controls the memory controller 1 in an integrated manner. The processor 12 is a CPU, an MPU, or the like. When the request is received from the host via the host interface 13, the processor 12 performs control in response to the request. For example, the processor 12 instructs the memory interface 15 to write the user data and a parity into the semiconductor memory device 2 in response to the request from the host. Further, the processor 12 instructs the memory interface 15 to read the user data and the parity from the semiconductor memory device 2 in response to the request from the host.

The processor 12 determines a storage area (memory area) on the semiconductor memory device 2 with respect to the user data stored in the RAM 11. The user data is stored in the RAM 11 via the internal bus 16. The processor 12 determines the memory area with respect to data in a unit of page (page data), which is a unit of writing. The user data, which is stored in one page of the semiconductor memory device 2, will be also referred to as "unit data" in the following description. The unit data is generally encoded and is stored in the semiconductor memory device 2 as a code word. The encoding is optional in the present embodiment. The memory controller 1 may store the unit data in the semiconductor memory device 2 without encoding, and FIG. 1 shows a configuration in which the encoding is performed, as an example. When the memory controller 1 does not perform the encoding, the page data matches the unit data. Further, one code word may be generated based on one unit data, or one code word may be generated based on divided data obtained by dividing the unit data. Also, one code word may be generated by using a plurality of unit data.

The processor 12 determines the memory area of the semiconductor memory device 2, which is a write destination, for each unit data. A physical address is allocated to the memory area of the semiconductor memory device 2. The processor 12 manages the memory area that is a write destination of the unit data, by using the physical address. The processor 12 designates the determined memory area (physical address) and instructs the memory interface 15 to write the user data to the semiconductor memory device 2. The processor 12 manages a correspondence between a logical address of the user data (logical address managed by the host) and the physical address. When receiving the read request including the logical address from the host, the processor 12 specifies the physical address corresponding to the logical address, designates the physical address, and instructs the memory interface 15 to read the user data.

The ECC circuit 14 encodes the user data stored in the RAM 11 to generate the code word. Further, the ECC circuit 14 decodes the code word read from the semiconductor memory device 2. The RAM 11 temporarily stores the user data received from the host until the user data is stored in the semiconductor memory device 2, or temporarily stores the data read from the semiconductor memory device 2 until the user data is transmitted to the host. The RAM 11 is a general-purpose memory, such as an SRAM or a DRAM.

FIG. 1 shows a configuration example in which the memory controller 1 includes the ECC circuit 14 and the memory interface 15. Meanwhile, the ECC circuit 14 may be built in the memory interface 15. Further, the ECC circuit 14 may be built in the semiconductor memory device 2. A specific configuration or arrangement of each element shown in FIG. 1 is not particularly limited to the one shown.

When the write request is received from the host, the memory system 3 in FIG. 1 operates as follows. The processor 12 temporarily stores the data to be written in the RAM 11. The processor 12 reads the data stored in the RAM 11 and inputs the read data to the ECC circuit 14. The ECC circuit 14 encodes the input data and inputs the code word to the memory interface 15. The memory interface 15 writes the input code word to the semiconductor memory device 2.

When the read request is received from the host, the memory system 3 in FIG. 1 operates as follows. The memory interface 15 inputs the code word read from the semiconductor memory device 2 to the ECC circuit 14. The ECC circuit 14 decodes the input code word and stores the decoded data in the RAM 11. The processor 12 transmits the data stored in the RAM 11 to the host via the host interface 13.

1.2 Hardware Configuration of Memory System

Figure 3:
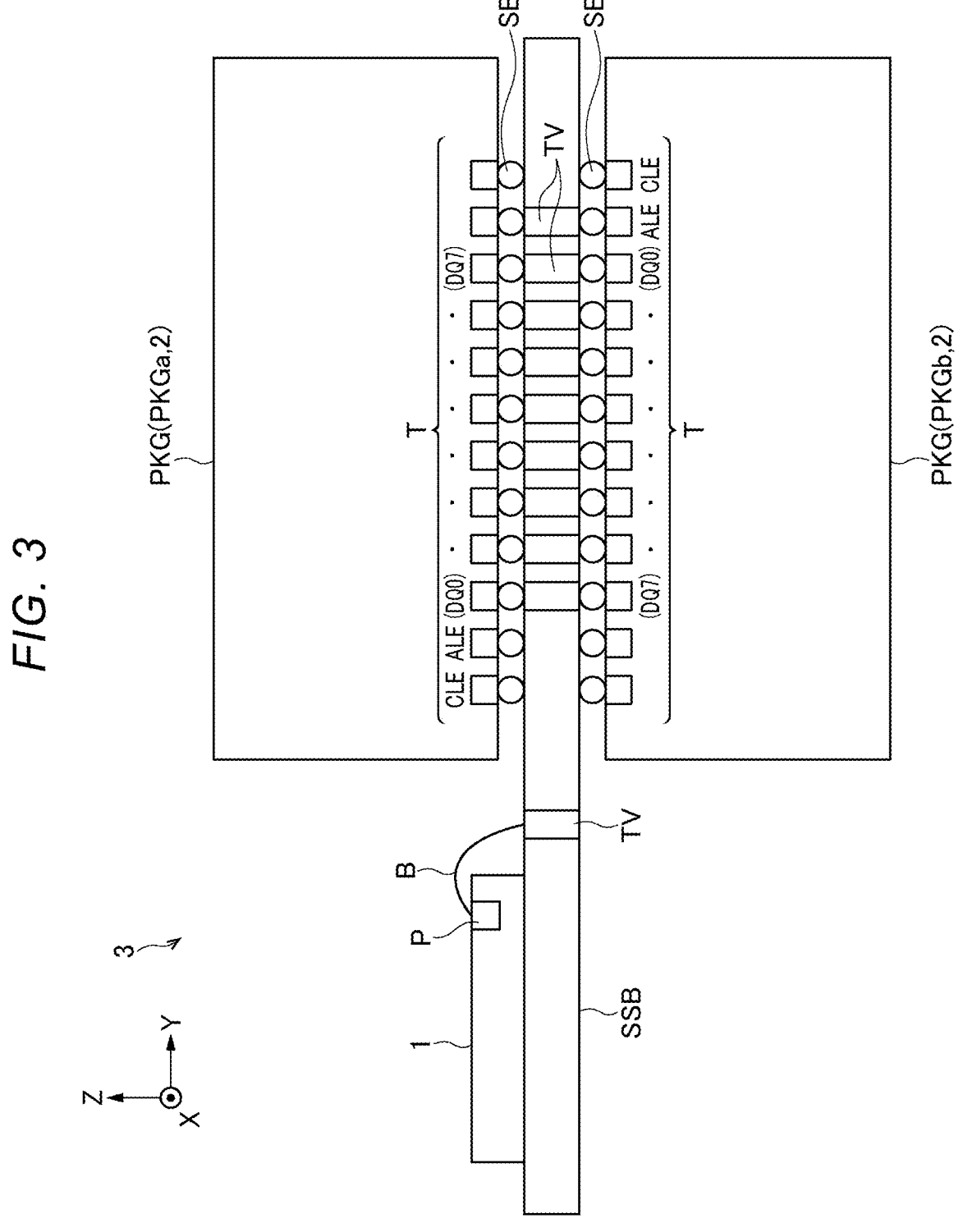
FIG. 3 is a side view showing a hardware configuration of the memory system according to the embodiment.

Hereinafter, a hardware configuration of the memory system 3 will be described. FIG. 3 is a side view schematically showing a configuration example of the memory system 3. The memory system 3 includes a system installation substrate SSB, a plurality of packages PKG disposed on the system installation substrate SSB, and the memory controller 1. The memory controller 1 and a part of the packages PKG are disposed on an upper surface of the system installation substrate SSB. The rest of the packages PKG is disposed on a lower surface of the system installation substrate SSB.

Figure 4A:
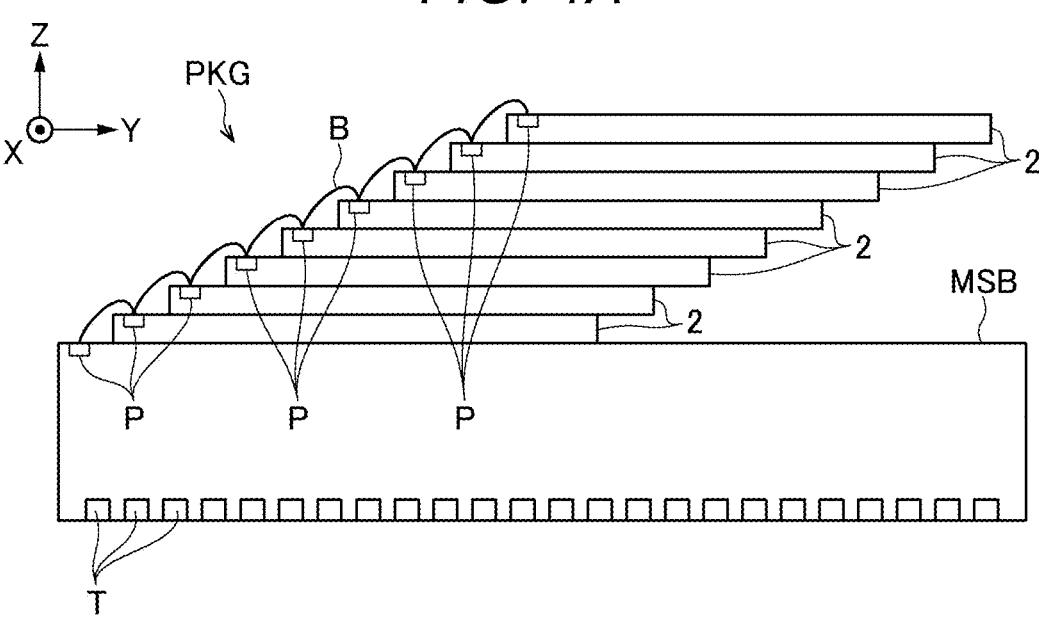
FIGS. 4A and 4B are a side view and a plan view each showing a hardware configuration of a package containing the memory system according to the embodiment.
Figure 4B:
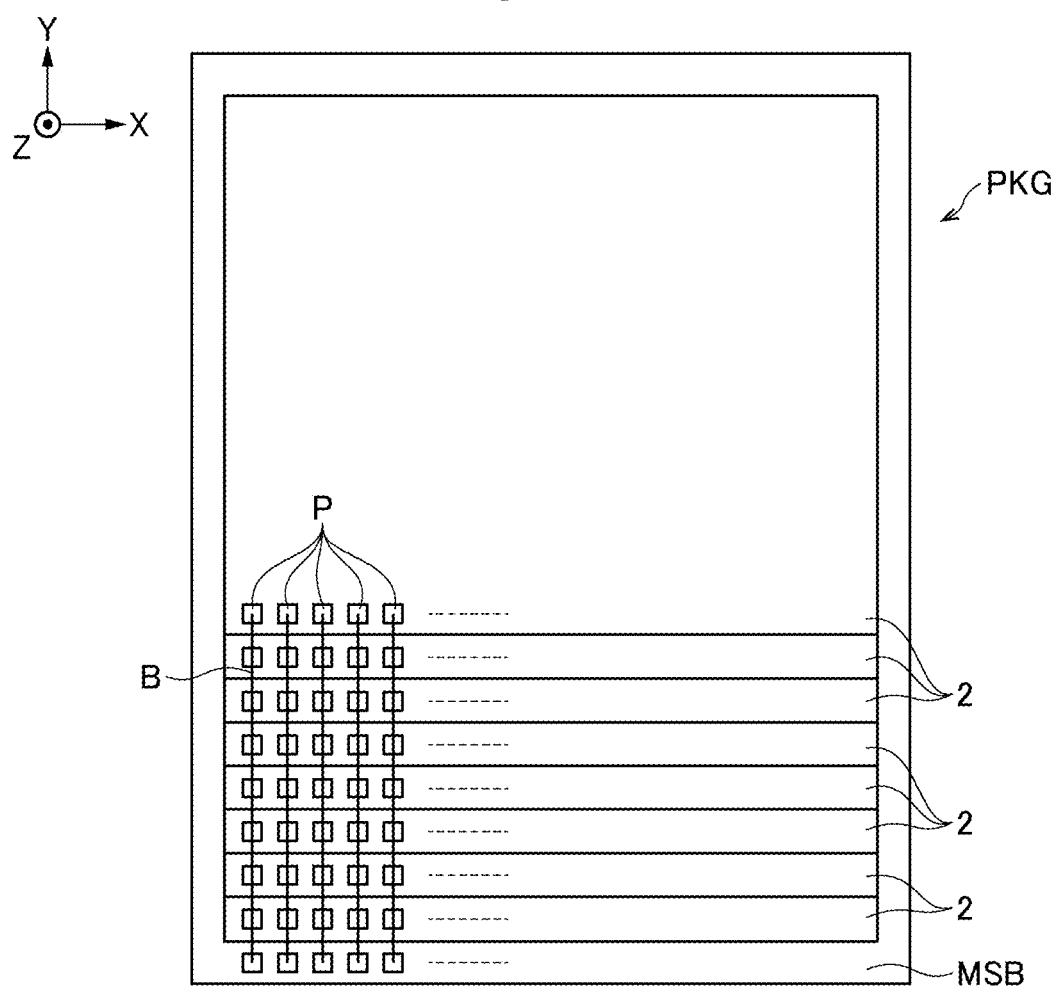

FIG. 4A is a side view schematically showing a configuration example of the package PKG, and FIG. 4B is a plan view schematically showing the configuration example of the package PKG. As shown in FIG. 4A, the package PKG includes a memory chip installation substrate MSB and the plurality of semiconductor memory devices 2 stacked on the memory chip installation substrate MSB. A pad electrode P is provided in an area of an upper surface of the memory chip installation substrate MSB at an end part in a Y direction, and the other partial area is adhered to the lower surface of the semiconductor memory device 2 via an adhesive agent or the like. As shown in FIG. 4A, the pad electrode P is provided in an area of the upper surface of the semiconductor memory device 2 at the end part in the Y direction, and the other area is adhered to the lower surface of the other semiconductor memory device 2 via an adhesive agent or the like. The pad electrodes P corresponding to each other among the plurality of semiconductor memory devices 2 are commonly connected by a bonding wire B. Electrode terminals T are provided on a lower surface of the memory chip installation substrate MSB. The pad electrodes P on the upper surface of the memory chip installation substrate MSB are connected to the electrode terminals T on the lower surface. The memory chip installation substrate MSB may be, for example, a grid array substrate. The plurality of semiconductor memory devices 2 and the bonding wires B on the upper surface of the memory chip installation substrate MSB are covered with, for example, a sealing resin, which is not shown.

In addition, as shown in FIG. 4B, the memory chip installation substrate MSB and the plurality of semiconductor memory devices 2 each include a plurality of pad electrodes P arranged in an X direction. The plurality of pad electrodes P of each of the semiconductor memory devices 2 correspond to input/output pads of each of the signals /CE, CLE, ALE, /WE, /RE, RE,/WP, DQ<7:0>, DQS, and /DQS.

The memory chip installation substrate MSB and the plurality of pad electrodes P provided in the plurality of semiconductor memory devices 2 are connected to each other via the bonding wires B. For example, among the plurality of semiconductor memory devices 2, the pad electrodes P corresponding to the command latch enable signal CLE are connected to each other, and the pad electrodes P corresponding to the address latch enable signal ALE are connected to each other. The same applies to the other terminals. Therefore, the pad electrodes P of each of the semiconductor memory devices 2 inside the package PKG are connected to the outside of the package PKG via the electrode terminals T on the lower surface of the memory chip installation substrate MSB.

As shown in FIG. 3, the plurality of pad electrodes P are provided on the memory controller 1. The pad electrode P of the memory controller 1 is connected to the system installation substrate SSB via the bonding wire B. The electrode terminals T of the plurality of packages PKG are connected to the system installation substrate SSB via solder balls SB. The pad electrodes P of the memory controller 1 and the electrode terminals T of the plurality of packages PKG are connected to each other by wiring, which is not shown and is formed on the upper surface and the lower surface of the system installation substrate SSB. The upper surface and the lower surface of the system installation substrate SSB are connected to each other via through-electrodes TV.

A part of the electrode terminals T of a package PKGa disposed on the upper surface of the system installation substrate SSB and a part of the electrode terminals T of a package PKGb disposed on the lower surface of the system installation substrate SSB may be connected to each other via the through-electrode TV. More specifically, the electrode terminals T corresponding to the data signal DQ<7:0> in the package PKG disposed on the upper surface of the system installation substrate SSB and the electrode terminals T corresponding to the data signal DQ<7:0> in the package PKG disposed on the lower surface of the system installation substrate SSB may be connected to each other via the through-electrode TV.

1.3 Schematic Configuration of Semiconductor Memory Device

Figure 5:
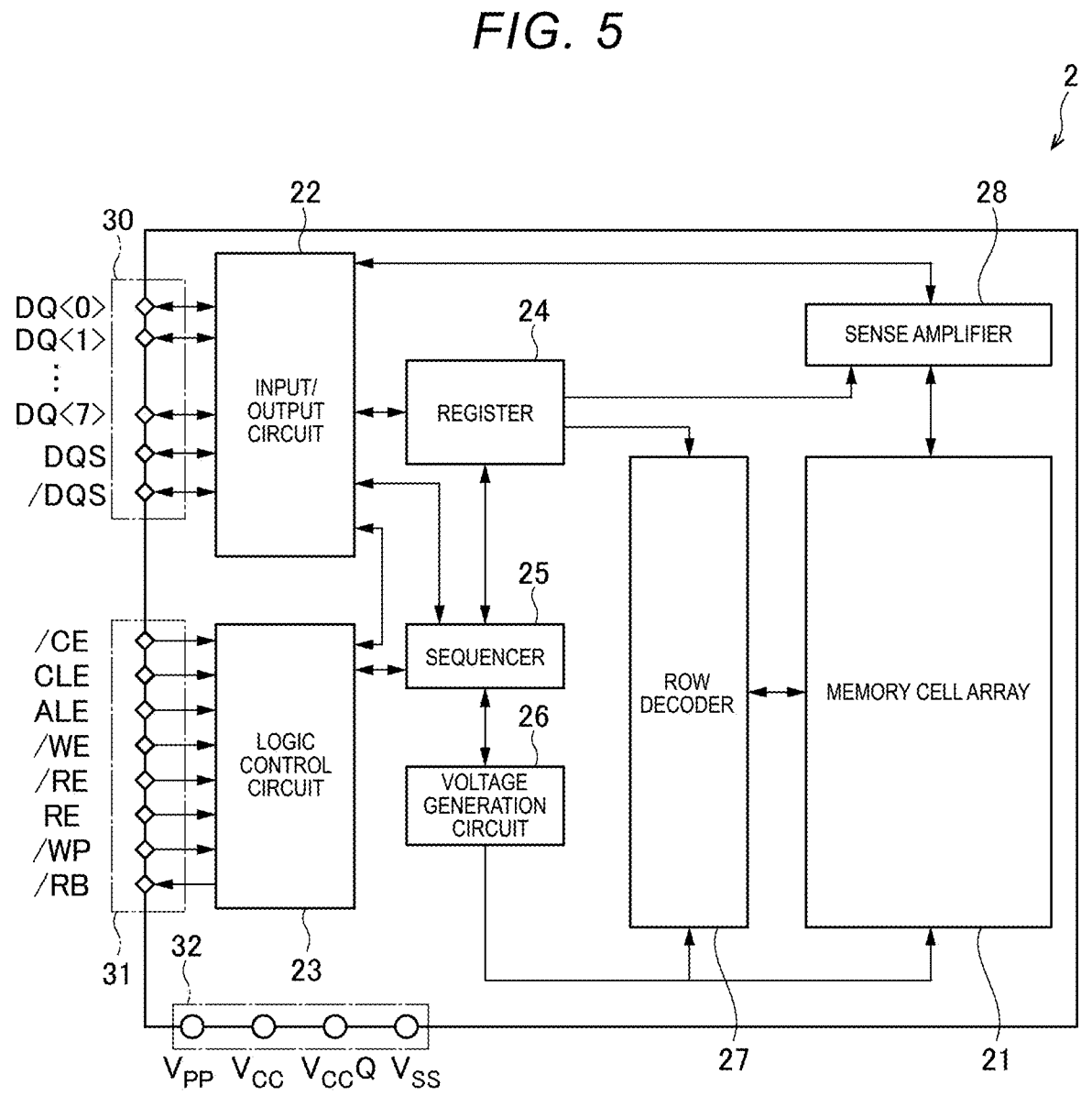

As shown in FIG. 5, the semiconductor memory device 2 includes a memory cell array 21, an input/output circuit 22, a logic control circuit 23, the register 24, a sequencer 25, a voltage generation circuit 26, a row decoder 27, the sense amplifier 28, an input/output pad group 30, a logic control pad group 31, and a power input terminal group 32.

The memory cell array 21 is a part that stores data. The memory cell array 21 is configured with a plurality of memory cell transistors associated with a plurality of bit lines and a plurality of word lines. The input/output circuit 22 communicates the data signal DQ<7:0> and the data strobe signals DQS and /DQS with the memory controller 1. The input/output circuit 22 transfers the command and the address in the data signal DQ<7:0> to the register 24. Further, the input/output circuit 22 exchanges the write data and the read data with the sense amplifier 28.

The logic control circuit 23 receives, from the memory controller 1, the chip enable signal /CE, the command latch enable signal CLE, the address latch enable signal ALE, the write enable signal /WE, the read enable signals /RE and RE, and the write protect signal /WP. Further, the logic control circuit 23 transfers the ready busy signal /RB to the memory controller 1 to notify the outside of the state of the semiconductor memory device 2.

The register 24 temporarily stores various data. For example, the register 24 stores a command for giving instructions for a write operation, a read operation, an erasing operation, and the like. This command is input from the memory controller 1 to the input/output circuit 22, and then transferred from the input/output circuit 22 to the register 24 and stored therein. The register 24 also stores the address corresponding to the above-described command. This address is input from the memory controller 1 to the input/output circuit 22, and then transferred from the input/output circuit 22 to the register 24 and stored therein.

The sequencer 25 controls the operation of each unit including the memory cell array 21 based on the control signals input from the memory controller 1 to the input/output circuit 22 and the logic control circuit 23. The voltage generation circuit 26 is a part that generates the voltage required for each of the write operation, the read operation, and the erasing operation for the data in the memory cell array 21. This voltage includes, for example, a voltage applied to each of the plurality of word lines and the plurality of bit lines of the memory cell array 21. The operation of the voltage generation circuit 26 is controlled by the sequencer 25.

The row decoder 27 is a circuit configured with a switch group for applying a voltage to each of the plurality of word lines of the memory cell array 21. The row decoder 27 receives a block address and a row address from the register 24, selects a block based on the block address, and selects the word line based on the row address. The row decoder 27 switches an open/closed state of the switch group such that the voltage from the voltage generation circuit 26 is applied to the selected word line. The operation of the row decoder 27 is controlled by the sequencer 25.

The sense amplifier 28 is a circuit for adjusting the voltage applied to the bit line of the memory cell array 21 or reading the data of the memory cell array 21 through the bit line. During data reading, the sense amplifier 28 determines the data stored in the memory cell transistor of the memory cell array 21 based on the current flowing through the bit line, and transfers the determined read data to the input/output circuit 22. During data writing, the sense amplifier 28 control the voltage of the bit line based on the data to be written to the memory cell transistor. The operation of the sense amplifier 28 is controlled by the sequencer 25.

The input/output pad group 30 is a part provided with a plurality of terminals (pads) for communicating signals between the memory controller 1 and the input/output circuit 22. Each terminal is provided individually corresponding to each of the data signal DQ<7:0> and the data strobe signals DQS and /DQS.

The logic control pad group 31 is a part provided with a plurality of terminals for communicating signals between the memory controller 1 and the logic control circuit 23. Each terminal is provided individually corresponding to the chip enable signal /CE, the command latch enable signal CLE, the address latch enable signal ALE, the write enable signal /WE, the read enable signal /RE and RE, the write protect signal /WP, and the ready busy signal /RB.

The power input terminal group 32 is a part provided with a plurality of terminals for receiving voltages for the operation of the semiconductor memory device 2. The voltages applied to the terminals include power voltages Vcc, VccQ, Vpp, and a ground voltage Vss. The power voltage Vcc is a circuit power voltage applied from the outside as an operation power, and is, for example, a voltage of about 2.5 V. The power voltage Vcc is, for example, a voltage for generating a voltage Vdd, which is an internal power voltage of the semiconductor memory device 2. The power voltage Vdd is a voltage of, for example, about 1.5 V. The power voltage VccQ is a power voltage lower than the power voltage Vcc, and is, for example, a voltage of 1.2 V. The power voltage VccQ is an input/output power voltage used when communicating the signal between the memory controller 1 and the semiconductor memory device 2. The power voltage VccQ is supplied to at least a driver circuit and a receiver circuit, which are not shown, of the input/output circuit 22. The power voltage Vpp is a power voltage higher than the power voltage Vcc, and for example, is a voltage of 12 V.

1.4 Circuit Configuration of Memory Cell Array

Figure 6:
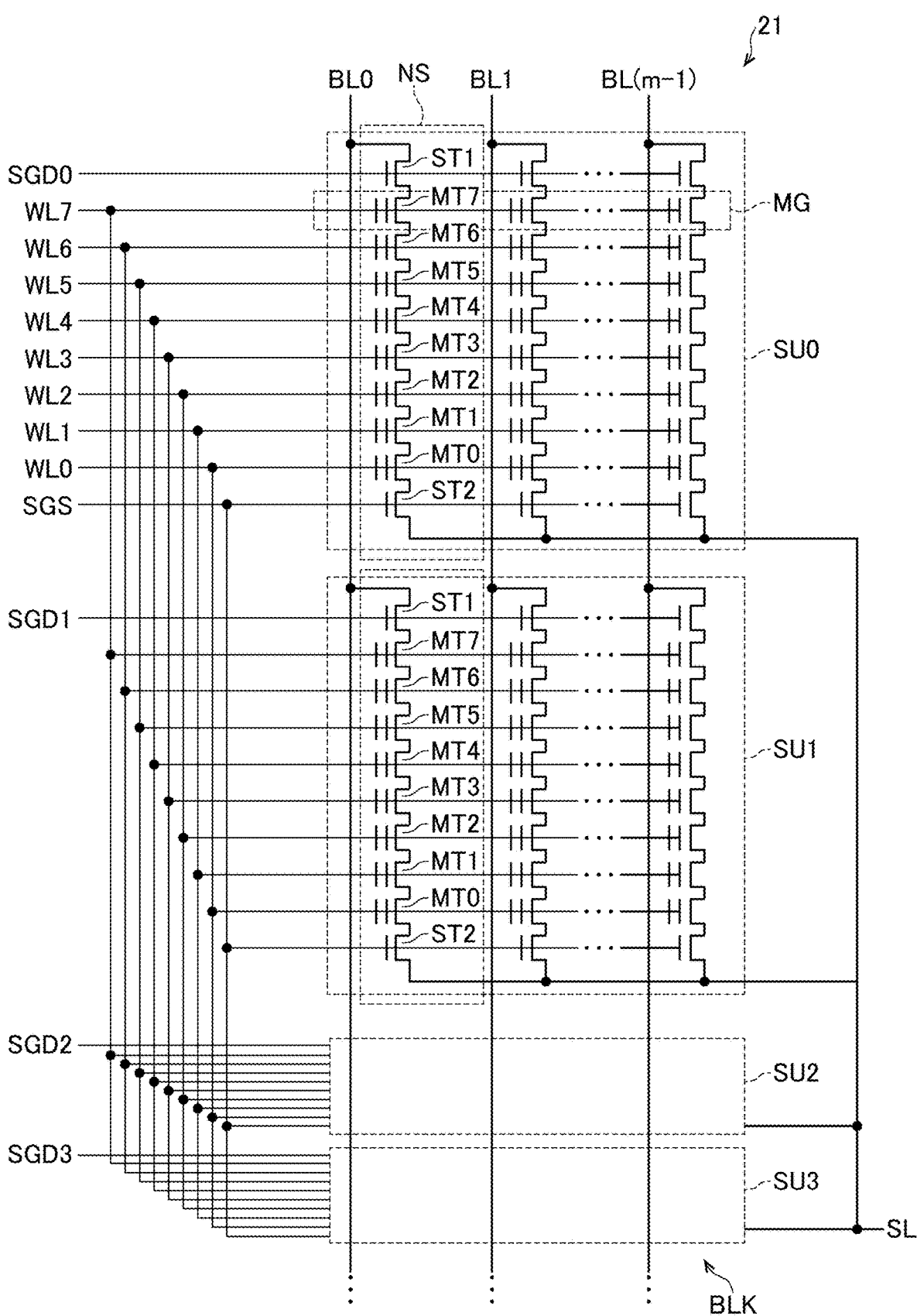
FIG. 6 is a circuit diagram showing a configuration of the semiconductor memory device according to the embodiment.

Hereinafter, a circuit configuration of the memory cell array 21 will be described. As shown in FIG. 6, the memory cell array 21 is configured with a plurality of blocks BLK. In FIG. 6, only one of the plurality of blocks BLK is shown. The configuration of the other block BLK provided in the memory cell array 21 is the same as that shown in FIG. 6.

As shown in FIG. 6, the block BLK includes, for example, four string units SU (SU0 to SU3). Each string unit SU includes a plurality of NAND strings NS. Each of the NAND strings NS includes, for example, eight memory cell transistors MT (MT0 to MT7), and select transistors ST1 and ST2.

The memory cell transistors MT are disposed and connected in series between the select transistor ST1 and the select transistor ST2. The memory cell transistor MT7 on one end side is connected to a source of the select transistor ST1, and the memory cell transistor MT0 on the other end side is connected to a drain of the select transistor ST2.

Gates of the select transistors ST1 in the string units SU0 to SU3 are commonly connected to the select gate lines SGD0 to SGD3, respectively. The gate of the select transistor ST2 is commonly connected to the same select gate line SGS across the plurality of string units SU in the same block BLK. Gates of the memory cell transistors MT0 to MT7 in the same block BLK are commonly connected to the word lines WL0 to WL7, respectively. That is, the word lines WL0 to WL7 and the select gate line SGS are common to the plurality of string units SU0 to SU3 in the same block BLK, whereas the select gate line SGD is provided individually for each of the string units SU0 to SU3 even in the same block BLK.

The memory cell array 21 is provided with m bit lines BL (BL0, BL1, . . . , BL(m−1)). "m" is an integer corresponding to the number of NAND strings NS provided in one string unit SU. A drain of the select transistor ST1 in each of the NAND strings NS is connected to the corresponding bit line BL. A source of each select transistor ST2 of the NAND string NS is connected to a source line SL. The source line SL is common to the sources of a plurality of select transistors ST2 provided in the block BLK.

The data stored in a plurality of memory cell transistors MT in the same block BLK are collectively erased. Meanwhile, data read and write are collectively performed with respect to the plurality of memory cell transistors MT connected to one word line WL and belonging to one string unit SU. Each of the memory cells may store 3-bit data including a high-order bit, a middle-order bit, and a low-order bit.

That is, the semiconductor memory device 2 according to the present embodiment adopts a TLC method of storing the 3-bit data in one memory cell transistor MT as a method of writing the data to the memory cell transistor MT. Instead of such a method, the semiconductor memory device 2 may adopt an MLC method or the like of storing 2-bit data in one memory cell transistor MT as the method of writing the data to the memory cell transistor MT. The number of bits of the data stored in one memory cell transistor MT is not limited to any particular number.

It should be noted that, in the following description, a set of 1-bit data stored by the plurality of memory cell transistors MT that is connected to one word line WL and belongs to one string unit SU is referred to as a "page". In FIG. 6, the plurality of memory cell transistors MT corresponding to one of the sets of 1-bit data described above is denoted by a reference label "MG".

When the 3-bit data is stored in one memory cell transistor MT as in the present embodiment, a set of the plurality of memory cell transistors MT connected to a common word line WL in one string unit SU may store data for three pages. In these pages, a page of the low-order bit data is hereinafter also referred to as a "low-order page", and data of the low-order page is hereinafter also referred to as "low-order page data". Similarly, a page of the middle-order bit data is hereinafter also referred to as a "middle-order page", and data of the middle-order page is hereinafter also referred to as "middle-order page data". A page of the high-order bit data is hereinafter also referred to as a "high-order page", and data of the high-order page is hereinafter also referred to as "high-order page data".

1.5 Cross-Sectional Structure of Semiconductor Memory Device

Figure 7:
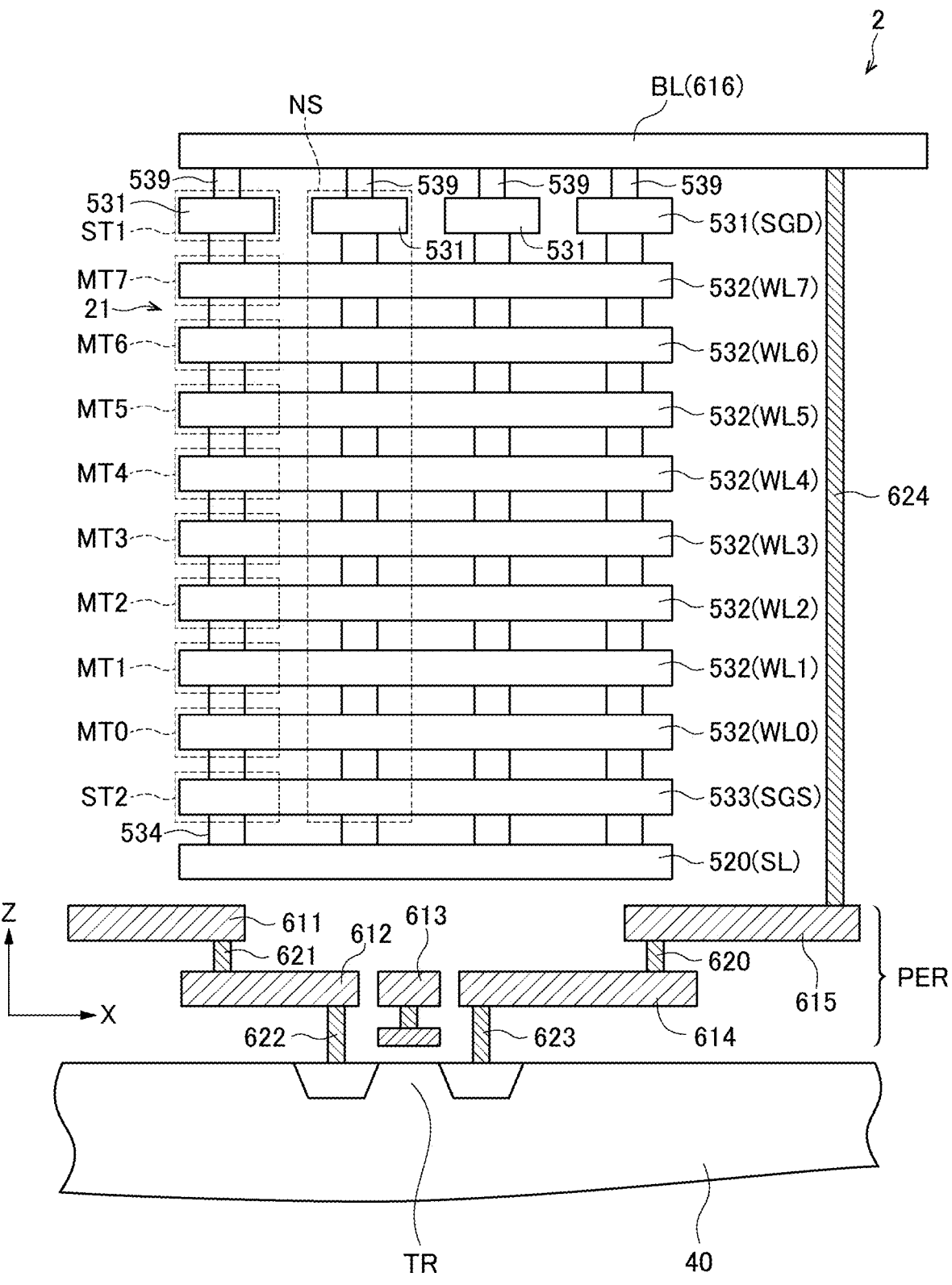
FIG. 7 is a cross-sectional view showing a cross-sectional structure of the semiconductor memory device according to the embodiment.

As shown in FIG. 7, the semiconductor memory device 2 has a structure in which a peripheral circuit PER and the memory cell array 21 are subsequently disposed on a semiconductor substrate 40. The semiconductor memory device 2 according to the present embodiment has a so-called CMOS under array (CUA) structure in which the peripheral circuit PER is disposed below the memory cell array 21.

In the memory cell array 21, the plurality of NAND strings NS are formed on a conductive layer 520. The conductive layer 520 is also called a buried source line (BSL) and corresponds to the source line SL in FIG. 6. Above the conductive layer 520, a wiring layer 533 that functions as the select gate line SGS, a plurality of wiring layers 532 that function as the word lines WL, and a wiring layer 531 that functions as the select gate line SGD are stacked. An insulating layer, which is not shown, is disposed between the stacked wiring layers 533, 532, and 531.

A plurality of memory holes 534 are formed in the memory cell array 21. The memory hole 534 is a hole that penetrates the wiring layers 533, 532, and 531 and the insulating layers between the wiring layers 533, 532, and 531 in an up-down direction and reaches the conductive layer 520. Each part of the memory hole 534 that intersects each of the stacked wiring layers 533, 532, and 531 functions as a transistor. Among these plurality of transistors, the transistor in the part intersecting the wiring layer 531 functions as the select transistor ST1. Among the plurality of transistors, the transistor in the part intersecting the wiring layer 532 functions as the memory cell transistor MT (MT0 to MT7). Among the plurality of transistors, the transistor in the part intersecting the wiring layer 533 functions as the select transistor ST2.

A wiring layer 616 that functions as the bit line BL is formed above the memory hole 534. An upper end of the memory hole 534 is connected to the wiring layer 616 via a contact plug 539. A plurality of structures similar to the structures shown in FIG. 7 are arranged in a depth direction of a surface of the drawing depicted in FIG. 7. One string unit SU is formed by a set that includes the plurality of NAND strings NS arranged in a row along the depth direction of the surface the drawing depicted in FIG. 7.

The semiconductor substrate 40 and the conductive layer 520 (source line SL) are disposed apart from each other, and a part of the peripheral circuit PER is disposed between the semiconductor substrate 40 and the conductive layer 520. The peripheral circuit PER is a circuit for carrying out the data write operation, the read operation, the erasing operation, and the like in the memory cell array 21. The sense amplifier 28, the row decoder 27, the voltage generation circuit 26, and the like shown in FIG. 5 are each a part of the peripheral circuit PER.

The peripheral circuit PER includes a transistor TR formed on an upper surface of the semiconductor substrate 40 and a plurality of conductors 611 to 615. The conductors 611 to 615 are wiring layers formed of, for example, conductors such as metal. The conductors 611 to 615 are distributed at a plurality of height positions, and are electrically connected to each other via contacts 620 to 623. The conductor 615 is electrically connected to the wiring layer 616 (bit line BL) via a contact 624.

1.6 Threshold Voltage Distribution of Memory Cell Transistor

FIG. 8 is a diagram schematically showing a threshold voltage distribution and the like of the memory cell transistor MT. The diagram in the middle part in FIG. 8 represents a correspondence relationship between a threshold voltage (horizontal axis) of the memory cell transistor MT and the number of memory cell transistors MT (vertical axis).

When the TLC method is adopted as in the present embodiment, the plurality of memory cell transistors MT form eight threshold voltage distributions as shown in the middle part in FIG. 8. These eight threshold voltage distributions correspond respectively to eight different write states and are referred to as an "ER" state, an "A" state, a "B" state, a "C" state, a "D" state, an "E" state, an "F" state, and a "G" state in order of increasing the threshold voltage. The table in the upper part of FIG. 8 shows an example of the 3-bit data assigned to each write state.

As described above, the threshold voltage of the memory cell transistor MT in the present embodiment may take one of eight candidate states set in advance, and the data is assigned to each of the candidate levels as described above. A read voltage used in each read operation is set between the threshold voltage distributions adjacent to each other. The "read voltage" is a voltage applied to the word line WL, which is connected to the memory cell transistor MT to be read, that is, the selected word line, during the read operation. In the read operation, the data is determined based on the determination result of whether or not the threshold voltage of the memory cell transistor MT to be read is higher than the applied read voltage. For example, as schematically shown in the diagram in the lower part of FIG. 8, a read voltage VrA for determining whether the threshold voltage of the memory cell transistor MT is included in the "ER" state or the "A" state is set between a maximum threshold voltage at the "ER" state and a minimum threshold voltage at the "A" state. Other read voltages VrB, VrC, VrD, VrE, VrF, and VrG are set similarly to the read voltage VrA.

A read pass voltage VPASS_READ is set to a voltage higher than the maximum threshold voltage of the highest threshold voltage distribution (for example, the "G" state). The memory cell transistor MT in which the read pass voltage VPASS_READ is applied to the gate enters an ON state regardless of the data stored therein.

When the data is assigned as described above, one page data of the low-order bit (low-order page data) in the read operation may be determined based on the read result using the read voltages VrA and VrE. One page data of the middle-order bit (middle-order page data) may be determined based on the read result using the read voltages VrB, VrD, and VrF. One page data of the high-order bit (high-order page data) may be determined based on the read result using the read voltages VrC and VrG.

1.7 Read Operation of Semiconductor Memory Device

Figure 9:
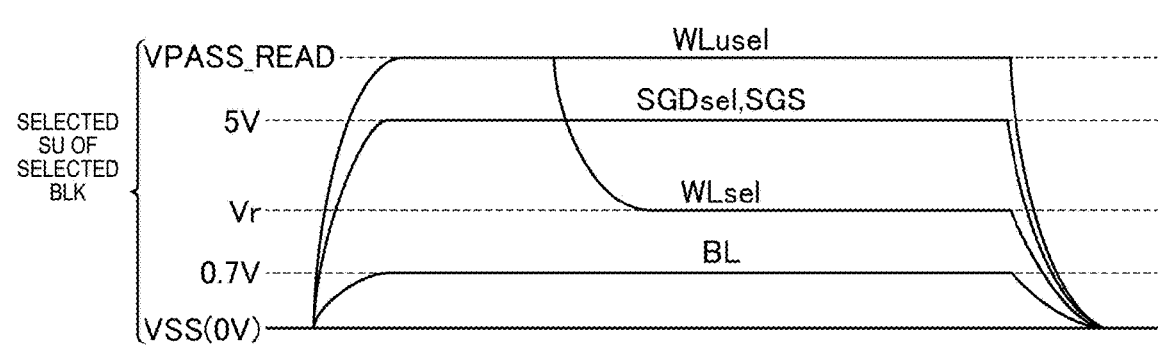
FIG. 9 is a graph showing a transition of a voltage of each wiring during a read operation of the semiconductor memory device according to the embodiment.
Figure 9:
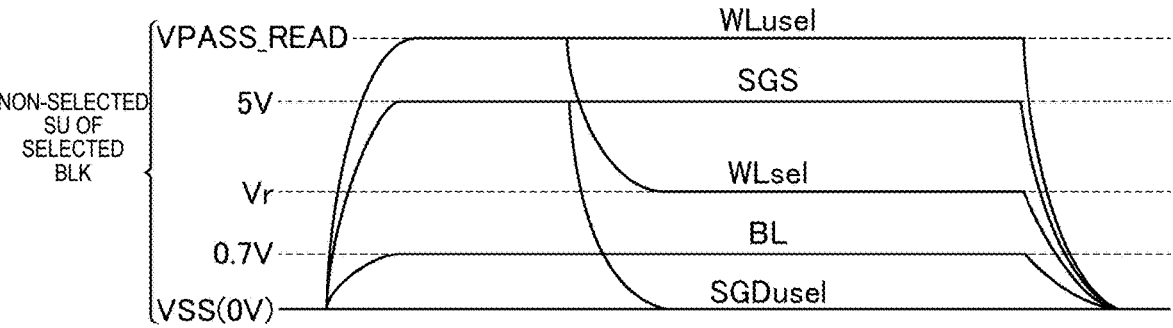
Figure 9:
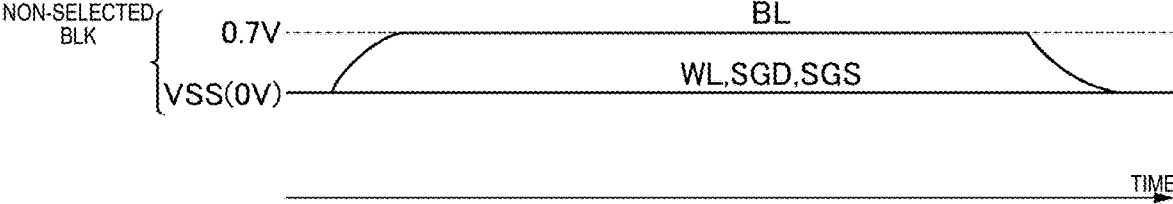

Hereinafter, an example of the read operation of the semiconductor memory device 2 will be described. FIG. 9 shows a transition of the voltage of each wiring line during the read operation. In the read operation, the NAND string NS including the memory cell transistors MT, which is a target of the read operation, is selected. Alternatively, the string unit SU including the page, which is a target of the read operation, is selected.

First, the row decoder 27 selects a block BLK as a target of the read operation, and further selects a string unit SU. Specifically, a voltage of, for example, 5 V is applied from the voltage generation circuit 26 to the select gate line SGD (selected select gate line SGDsel) in the selected string unit SU, the select gate line SGD (non-selected select gate line SGDusel) of the non-selected string unit SU in the selected block BLK, and the select gate line SGS via the row decoder 27. As a result, the select transistor ST1 and the select transistor ST2 provided in the selected block BLK enter an ON state. In addition, the read pass voltage VPASS_READ is applied to the word line WL to be read (selected word line WLsel) and the other word lines (non-selected word line WLusel) from the voltage generation circuit 26 via the row decoder 27. The read pass voltage VPASS_READ is a voltage at which the memory cell transistor MT is turned on regardless of the threshold voltage of the memory cell transistor MT and the threshold voltage is not changed. As a result, a current flows in all the NAND strings NS provided in the selected block BLK regardless of whether it is the selected string unit SU or the non-selected string unit SU.

Next, the read voltage Vr, such as VrA, is applied to the word line WL (selected word line WLsel) connected to the memory cell transistor MT, which is a target of the read operation, from the voltage generation circuit 26 via the row decoder 27. The read pass voltage VPASS_READ is applied to the rest of word lines (non-selected word lines WLusel).

While maintaining the voltage applied to the selected select gate line SGDsel and the select gate line SGS, for example, the voltage Vss is applied to the non-selected select gate line SGDusel from the voltage generation circuit 26 via the row decoder 27. As a result, the select transistor ST1 provided in the selected string unit SU maintains an ON state, whereas the select transistor ST1 provided in the non-selected string unit SU enters an OFF state. It should be noted that, regardless of whether it is the selected string unit SU or the non-selected string unit SU, the select transistor ST2 provided in the selected block BLK enters an ON state.

As a result, the NAND string NS provided in the non-selected string unit SU does not form a current path because at least the select transistor ST1 enters an OFF state. On the other hand, the NAND string NS provided in the selected string unit SU forms or does not form the current path according to a relationship between the read voltage Vr applied to the selected word line WLsel and the threshold voltage of the memory cell transistor MT.

The sense amplifier 28 applies the voltage to the bit line BL connected to the selected NAND string NS. In this state, the sense amplifier 28 reads the data based on a value of the current flowing through the bit line BL. Specifically, it is determined whether or not the threshold voltage of the memory cell transistor MT, which is a target of the read operation, is higher than the read voltage Vr applied to the memory cell transistor MT. It should be noted that the data need not be read based on the value of the current flowing through the bit line BL, and may be read based on a temporal change in the voltage of the bit line BL. In the latter case, the bit line BL is pre-charged to be a predetermined voltage.

1.8 Communication of Signal Between Memory Controller 1 and Semiconductor Memory Device Hereinafter, an example of the signal communicated between the memory controller 1 and the semiconductor memory device 2 when the data is read from the semiconductor memory device 2 will be described.

Figure 10:
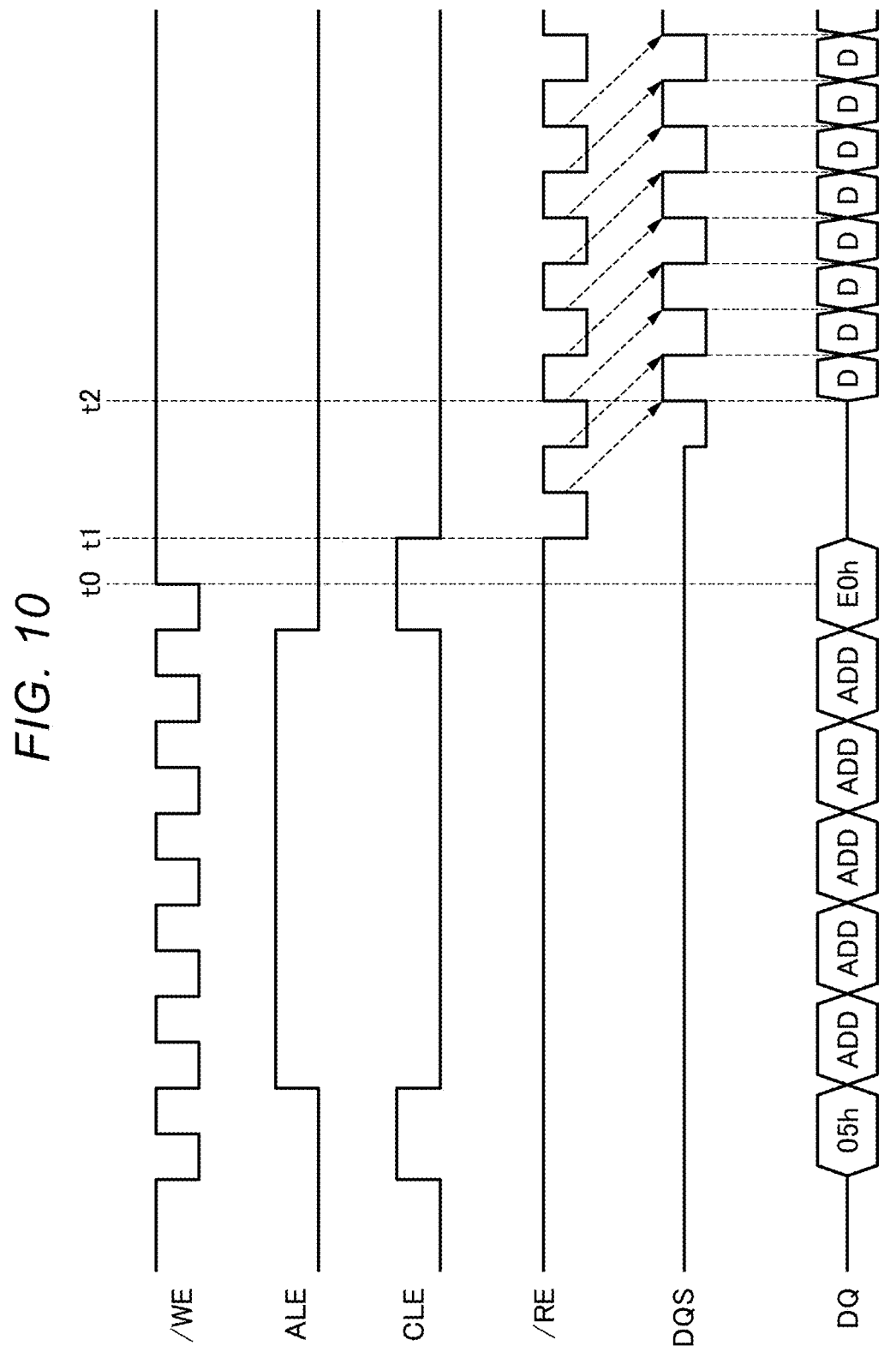
FIG. 10 is a timing chart showing an operation example during data write of the semiconductor memory device according to the embodiment.

As shown in FIG. 10, during the read operation, signals including "05h", a plurality of "ADD", and "E0h" are input in this order, from the memory controller 1 to the semiconductor memory device 2 as the data signal DQ<7:0>. "05h" is a command for executing the read operation for data from the memory cell array 21. "ADD" is a signal for designating an address that is a data read source. "E0h" is a command for starting the read operation.

In FIG. 10, the timing at which "E0h" is input to the semiconductor memory device 2 is shown as time t0. At time t1 after a predetermined period elapses from the time t0, the memory controller 1 starts toggling the read enable signal /RE. As described above, the read enable signal /RE is a signal for the memory controller 1 to read the data from the semiconductor memory device 2, and is input to the input/output pad group 30 of the semiconductor memory device 2. After the time t1, the read enable signal /RE is alternately switched (toggled) between the "H" level and the "L" level. The read enable signal /RE, which is switched in this manner, is used as a "read signal" for reading the data.

The semiconductor memory device 2 outputs the data as the data signal DQ<7:0> and switches the data strobe signal DQS between the "H" level and the "L" level each time the read enable signal /RE is switched (that is, each time each read signal is input). In FIG. 10, each of the data output as the data signal DQ<7:0> is shown as "D". The timing when the first data is output and the data strobe signal DQS is switched is shown as time t2. A correspondence relationship between switching of the read enable signal /RE input from the memory controller 1 and switching of the data strobe signal DQS output from the semiconductor memory device 2 is shown by a dotted arrow in FIG. 10.

It should be noted that the output of the read data from the semiconductor memory device 2 is performed by dividing one data into even data including even-numbered bits and odd data including odd-numbered bits, and outputting the even data and the odd data alternately. Each data shown as "D" in FIG. 10 is output as either even data or odd data.

Figure 11:
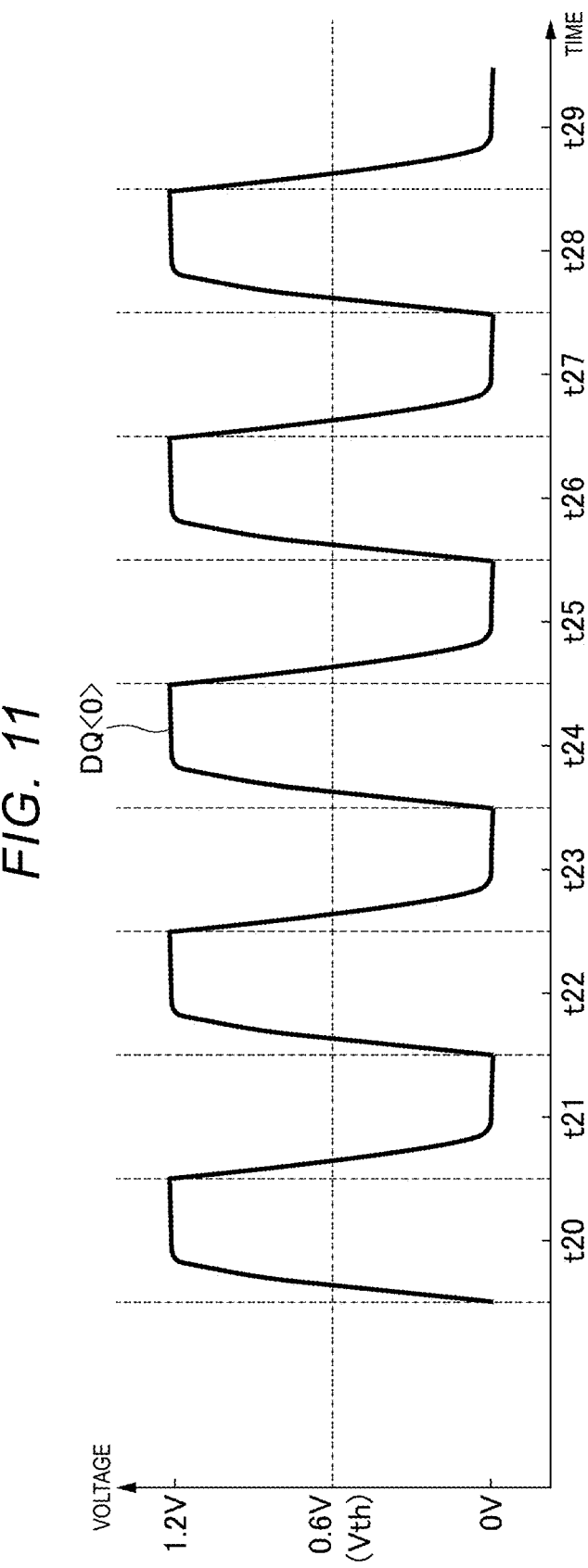
FIG. 11 is a graph showing an example of a transition of a data signal of a memory system according to a reference example.

When the data signal DQ<7:0> transmitted from the semiconductor memory device 2 is received, the memory interface 15 of the memory controller 1 acquires the data from the data signal DQ<7:0>. Specifically, for example, when the signal having a transition as shown in FIG. 11 is received as the data signal DQ<0> which is one of the data signals DQ<7:0> from the semiconductor memory device 2, the memory interface 15 compares the data signal DQ<0> with a determination voltage Vth at detection timings t20, t21, t22, and the like set based on the data strobe signal DQS. The detection timings t20, t21, t22, and the like are set, for example, as the rising edge timing and the falling edge timing of the signal obtained by deviating the phase of the data strobe signal DQS by 90 degrees. The memory interface 15 determines that the data signal DQ<0> is "0" data when the data signal DQ<0> is equal to or less than the determination voltage Vth, and determines that the data signal DQ<0> is "1" data when the data signal DQ<0> is larger than the determination voltage Vth. In an ideal state, the "0" data corresponds to the voltage at the "L" level, and the "1" data corresponds to the voltage at the "H" level. It should be noted that the correspondence between the logical data and the voltage level is not limited to this, and a different definition may be used.

It should be noted that, when the "H" level of the data signal DQ<0> is 1.2 V and the "L" level is 0 V, the determination voltage Vth is set to, for example, 0.6 V. In the present embodiment, 0.6 V corresponds to a reference voltage of the determination voltage Vth. Meanwhile, in the memory system 3 according to the present embodiment, the memory controller 1 and the semiconductor memory device 2 are connected to each other via the bonding wire B as shown in FIGS. 3, 4A, and 4B. In this case, parasitic capacitance or parasitic resistance exists in a signal path between the memory controller 1 and the semiconductor memory device 2. Therefore, as shown in FIG. 11, the rising edge and the falling edge of the data signal DQ<0> are not in an ideal vertical state and have a slight inclination. In other words, the data signal DQ<0> takes slight time to transition between the "L" level and the "H" level.

Meanwhile, in such a memory system 3, there is a tendency that a data rate is set to be high (cycle of a signal is set to be short) in order to increase the speed of the operation. When the data rate is set to be high, there is a possibility that an error occurs in reading the data due to deterioration in a waveform of the data signal DQ<0>.

Figure 12:
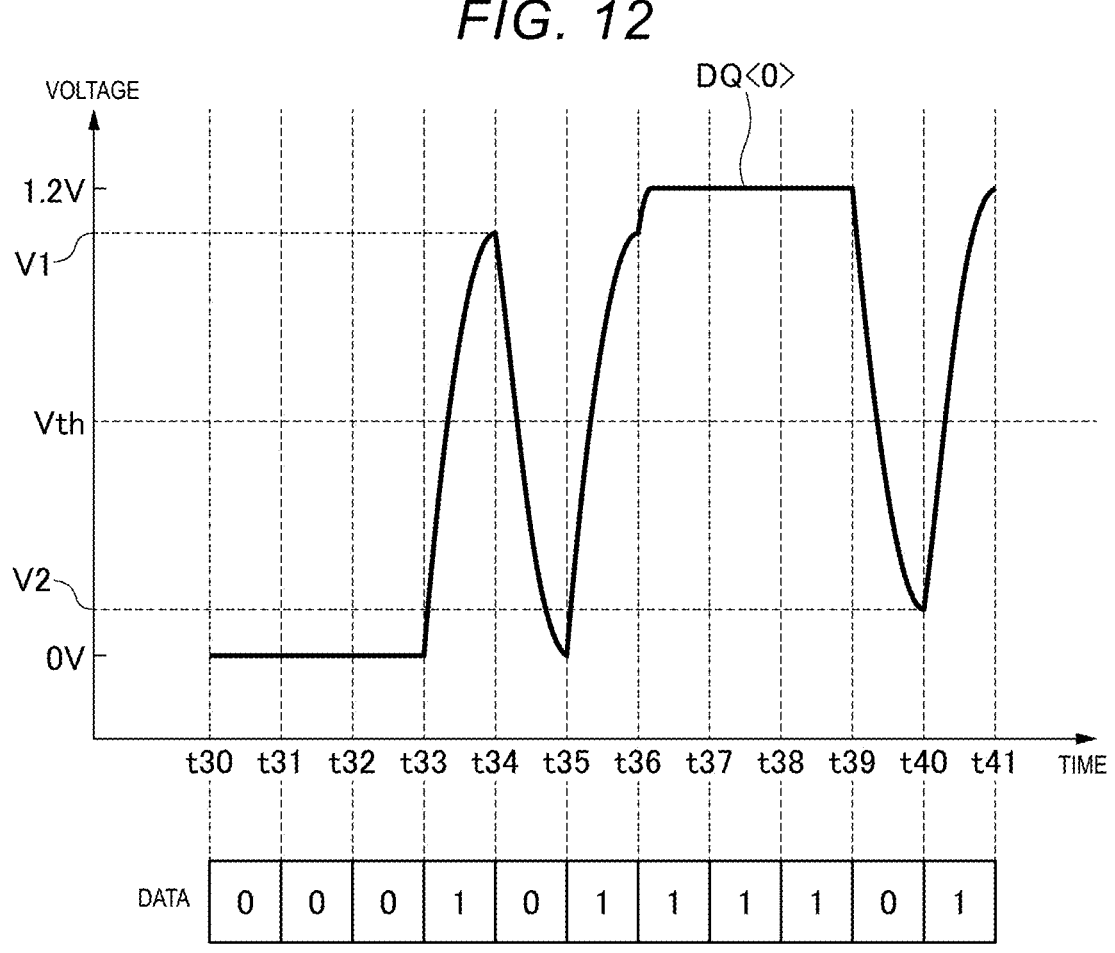
FIG. 12 is a graph showing an example of a transition of a data signal of the memory system according to the embodiment.

FIG. 12 shows an example of the waveform of the data signal DQ<0> when the data rate is increased (cycle of the signal is shortened). It should be noted that, in FIG. 12, times t30 to t41 indicate timings when the signal indicating the data of the data signal DQ<0> shown in the figure is switched, that is, the timings of the boundary between "D" and "D" shown in FIG. 10. FIG. 12 shows whether each data is "0" or "1".

As shown in FIG. 12, when "0" are consecutive as the data included in the data signal DQ<0> in a period from the time t30 to the time t33, the data signal DQ<0> transitions to 0 V. Thereafter, when the data included in the data signal DQ<0> is changed in the order of "1" and "0", the data signal DQ<0> rises to a predetermined voltage V1 at the time t34 and then falls to 0 V at the time t35. The voltage V1 is a voltage lower than 1.2 V that is an actual voltage at the "H" level. This is because the data signal DQ<0> is changed to the "L" level voltage before the data signal DQ<0> rises completely to the "H" level voltage when the data rate is increased (cycle of the signal is shortened).

Subsequently, when "1" are consecutive as the data included in the data signal DQ<0> in a period from the time t35 to the time t39, the data signal DQ<0> rises to 1.2 V and then transitions while maintaining the voltage value. Thereafter, when the data included in the data signal DQ<0> is changed in the order of "0" and "1", the data signal DQ<0> falls to a predetermined voltage V2 at the time t40 and then rises to 1.2 V at the time t41. The voltage V2 is a voltage higher than 0 V that is an actual voltage at the "L" level.

Such an analog characteristic distortion of the signal waveform of the data signal DQ<0> is a factor that causes the error in reading the data. For example, the waveform of the data signal DQ<0> when the data included in the data signal DQ<0> is switched from "0" to "1" is shown in both a period from the time t32 to the time t34 and a period from the time t39 to the time t41. The data "1" of the time t33 comes after data "0" continues for several cycles in the period from the time t30 to the time t33, and the data "1" of the time t40 comes after data is switched from "0" to "1" in the period from the time t39 to the time t40. While the voltage level of the data signal DQ<0> should be increased from 0V to the determination voltage Vth in the period from the time t33 to the time t34, the voltage level of the data signal DQ<0> should be increased from V2 to the determination voltage Vth in the period from the time t40 to the time t41. As a result, a timing when the data signal DQ<0> reaches the determination voltage Vth in the period from the time t33 to the time t34 is slightly delayed from a timing when the data signal DQ<0> reaches the determination voltage Vth in the period from the time t40 to the time t41. Due to such a difference in timing of reaching the determination voltage Vth, there is a possibility that the memory controller 1 erroneously acquires the data from the data signal DQ<0>. For example, in the example shown in FIG. 12, in the period from time t32 to time t33, if data was actually "1" (instead of "0" as depicted in FIG. 12) it requires a longer time for the data signal DQ<0> swinging from 0V towards 1.2V to exceed the determination voltage Vth as compared with the case where the data signal DQ<0> swings from V2 towards 1.2V. In this case, the memory controller 1 is more likely to acquire the "0" data even though the actual data is "1", and the likelihood of the "0" data falls. Similarly, if data was actually "0" (instead of "1" as depicted in FIG. 12) in the period from the time t38 to the time t39, it requires a longer time for the data signal DQ<0> swinging from 1.2V towards 0V to fall below the determination voltage Vth as compared with the case where the data signal DQ<0> swings from V1 towards 0V. In this case, the memory controller 1 is more likely to acquire the "1" data even though the actual data is "0", and the likelihood of the "1" data falls. In other words, the likelihood of data decreases if the same data repeats.

In addition to the distortion of the signal waveform of the data signal DQ<0> as described above, there is another factor that causes the error in reading the data. A plurality of factors include, for example, a distortion of the data strobe signal DQS and a deviation of the determination voltage Vth.

Figures 13A, 13B:
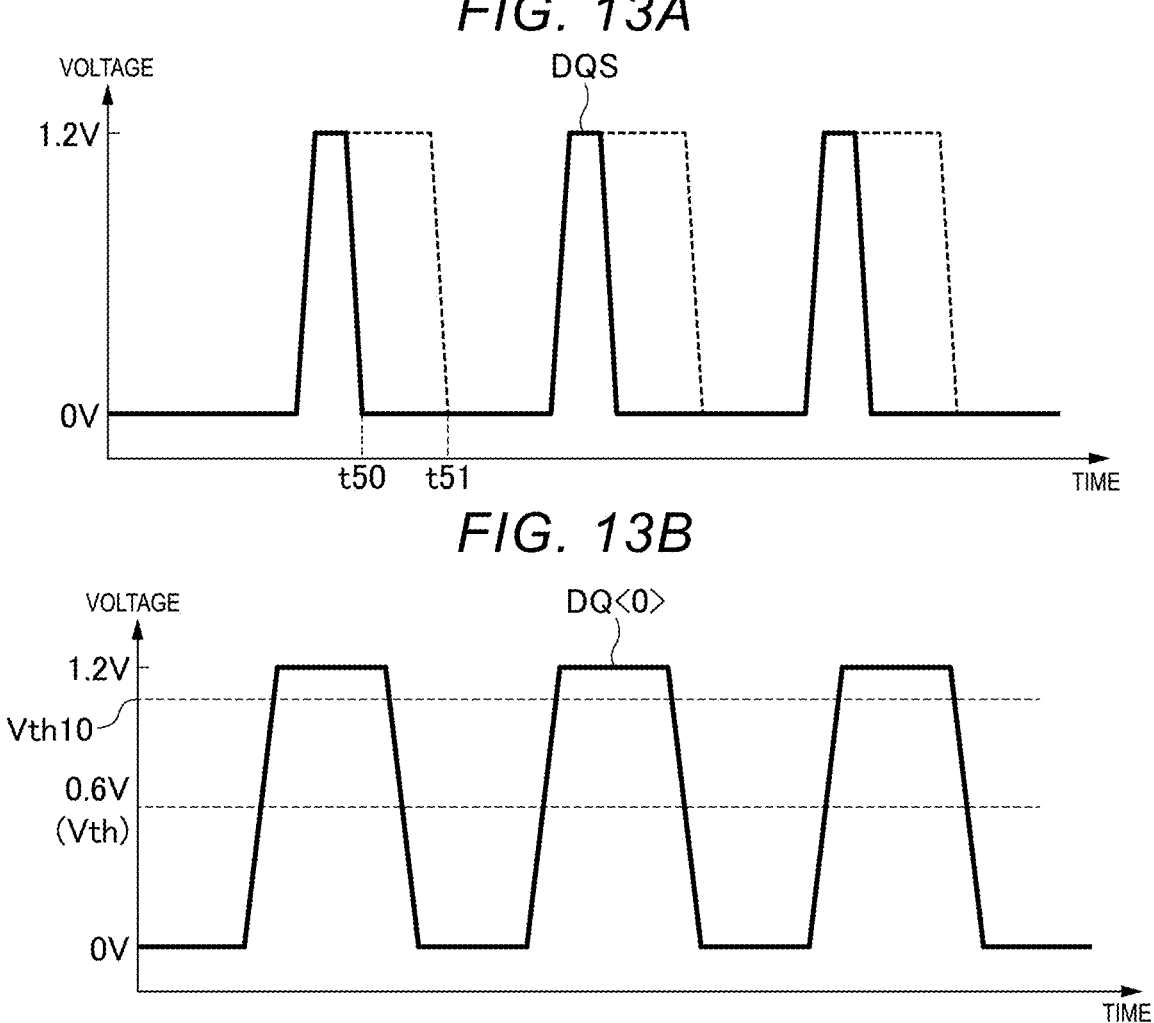
FIGS. 13A and 13B are graphs showing examples of transitions of a data strobe signal and the data signal according to the embodiment, respectively.

As shown by a broken line in FIG. 13A, a duty ratio of the data strobe signal DQS is usually set to 50%, but there is a possibility that the duty ratio deviates from 50% due to some factor. For example, as shown in FIG. 13A, when the duty ratio is less than 50%, the falling edge timing of the data strobe signal DQS is advanced from the time t51 to the time t50. As described above, the detection timing of the data from the data signal DQ<0> is set based on, for example, the falling edge timing of the data strobe signal DQS. In this case, when the detection timing of the data is advanced due to advance of the falling edge timing of the data strobe signal DQS, for example, even if the data is swinging between "1" and "0", the data may be detected before the data signal DQ<0> is fully swung to exceed or fall below the determination voltage Vth. In view of this, as the memory controller 1 is likely to erroneously acquire the data of "1" or "0", the likelihood of the data detected based on the falling edge timing of the data strobe signal DQS falls.

On the other hand, as shown in FIG. 13B, the determination voltage Vth is usually set to 0.6 V, but there is a possibility that the determination voltage Vth deviates due to a change in the power voltage, a change in temperature, or the like. For example, when the determination voltage Vth is changed to a voltage Vth10 higher than 0.6 V as shown in FIG. 13B, there is a high possibility that it is determined that the voltage of the data signal DQ<0> is equal to or lower than the determination voltage Vth. That is, there is a high possibility that the data signal DQ<0> of the "L" level is erroneously detected as being the "H" level. As a result, the memory controller 1 is more likely to acquire the "0" data even if the original data is actually "1", and the likelihood of the "0" data falls.

As described above, when detecting the data from the data signal DQ<7:0>, there is a possibility that the error may occur due to the influence of the distortion of the waveform of the data signal DQ<7:0> when the same data is repeated, the deviation of the duty ratio of the data strobe signal DQS, the deviation of the determination voltage Vth, and the like, and the likelihood of the data falls depending on the respective situations. In consideration of this, in the memory system 3 according to the present embodiment, it is possible to complement the loss of the data by correcting such an error in the data by an error correction process of the ECC circuit 14.

Hereinafter, a configuration in which the memory system 3 according to the present embodiment corrects the error in the data will be specifically described.

1.9 Circuit Configuration of Memory System

Figure 14:
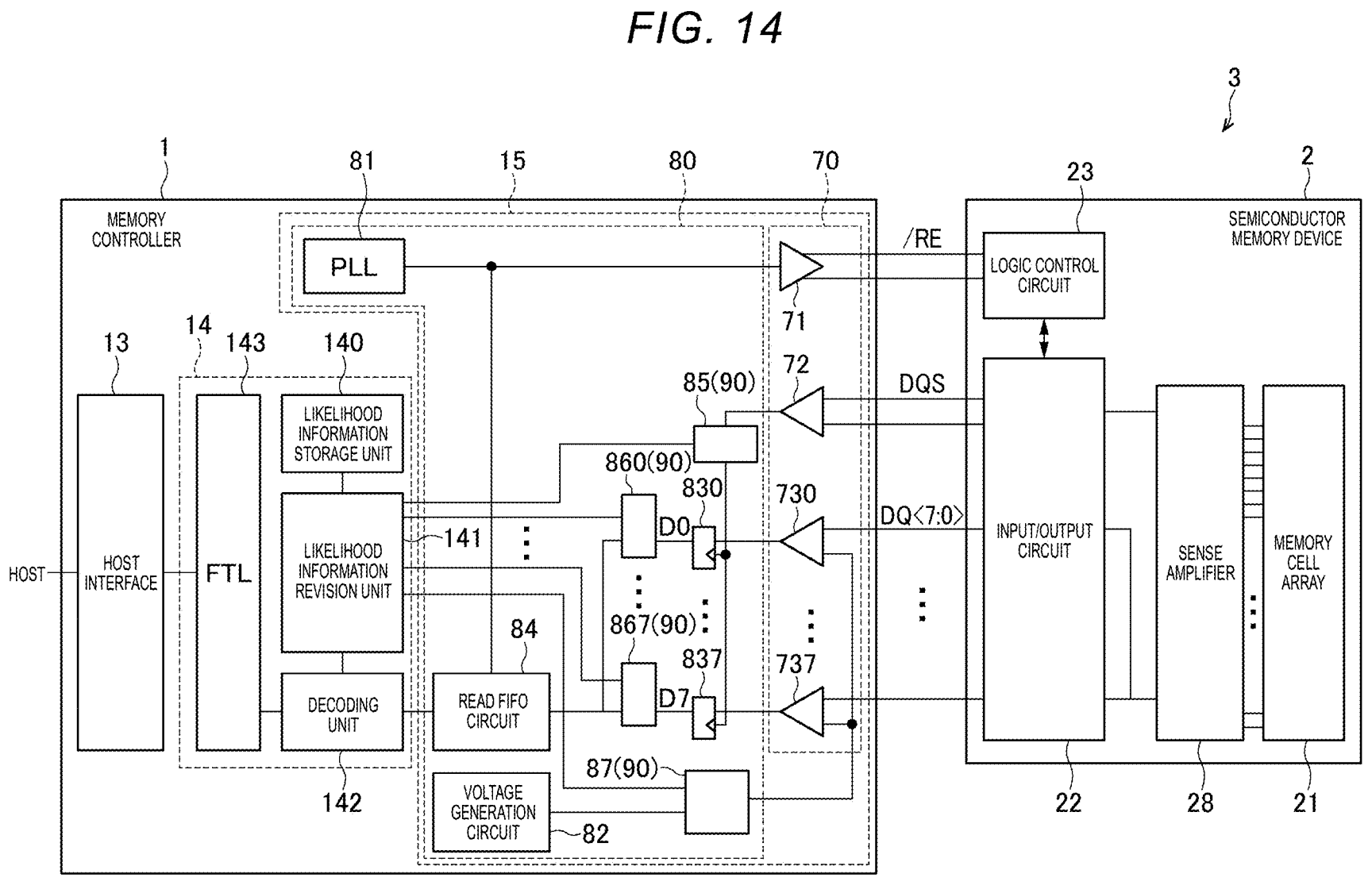

FIG. 14 shows a circuit configuration of the memory system 3. It should be noted that, in FIG. 14, only the configuration related to data reading from the semiconductor memory device 2 is shown, and the configuration related to data writing to the semiconductor memory device 2 is not shown.

As shown in FIG. 14, the memory interface 15 of the memory controller 1 includes an interface circuit 70 and a PHY circuit 80. In the present embodiment, the memory interface 15 includes circuits and is also referred to as a memory interface circuit. The interface circuit 70 includes a driver circuit 71 and receiver circuits 72 and 730 to 737.

The driver circuit 71 converts a clock signal generated by a phase locked loop (PLL) circuit 81 of the PHY circuit 80 into the read enable signal /RE, and transmits the converted read enable signal /RE to the semiconductor memory device 2.

The receiver circuit 72 receives the data strobe signal DQS transmitted from the semiconductor memory device 2, and outputs the received data strobe signal DQS to the PHY circuit 80. The receiver circuits 730 to 737 receive the data signal DQ<7:0> transmitted from the semiconductor memory device 2. It should be noted that, in FIG. 14, the receiver circuits 731 to 736 are not shown. The receiver circuits 730 to 737 are provided as many as the number corresponding to the number of bits of the data included in the data signal DQ<7:0>. In the present embodiment, since the data signal DQ<7:0> includes 8-bit parallel data, the interface circuit 70 is provided with eight receiver circuits 730 to 737. Each of the receiver circuits 730 to 737 compares the data signal DQ<7:0> transmitted from the semiconductor memory device 2 with the determination voltage Vth generated by a voltage generation circuit 82 of the PHY circuit 80, and acquires the "0" or "1" data from the data signal DQ<7:0>. For example, the receiver circuit 730 acquires the data from the data signal DQ<0> which is one of the data signals DQ<7:0> by comparing the data signal DQ<0> with the determination voltage Vth. Each of the receiver circuits 730 to 737 outputs the acquired data to the PHY circuit 80.

The PHY circuit 80 includes the PLL circuit 81, the voltage generation circuit 82, sampler circuits 830 to 837, a read first-in first-out (FIFO) circuit 84, a duty detection circuit 85, data counter circuits 860 to 867, and a voltage detection circuit 87. The PLL circuit 81 outputs the clock signals having a predetermined frequency to the driver circuit 71 and the read FIFO circuit 84 at intervals.

A plurality of sampler circuits 830 to 837 are provided corresponding to a plurality of receiver circuits 730 to 737, respectively. It should be noted that, in FIG. 14, the sampler circuits 831 to 836 are not shown. The data output from the receiver circuits 730 to 737 is input to the sampler circuits 830 to 837, and the data strobe signal DQS received by the receiver circuit 72 is input to the sampler circuits 830 to 837. The sampler circuits 830 to 837 sample the data output from the receiver circuits 730 to 737 at the timing based on the data strobe signal DQS, to output the data D0 to D7 corresponding to the data signal DQ<7:0>. For example, the sampler circuit 830 samples the data output from the receiver circuit 730 based on the rising edge and falling edge timings of the data strobe signal DQS deviated in phase by 90 degrees, and outputs the "0" or "1" data as the data D0 corresponding to the data signal DQ<0> to the read FIFO circuit 84. The other sampler circuits 831 to 837 also operate in the same manner to output the sampled data D1 to D7 to the read FIFO circuit 84.

The read FIFO circuit 84 is a buffer circuit. The read FIFO circuit 84 stores the data D0 to D7 output respectively from the sampler circuits 830 to 837 in a FIFO format. The read FIFO circuit 84 transmits the data D0 to D7 to the ECC circuit 14 in the order of input. As a result, the data read from the semiconductor memory device 2 is input to the ECC circuit 14.

The duty detection circuit 85 detects the duty ratio of the data strobe signal DQS output from the receiver circuit 72, and transmits the information on the detected duty ratio to the ECC circuit 14.

A plurality of data counter circuits 860 to 867 are provided corresponding to the plurality of sampler circuits 830 to 837, respectively. It should be noted that, in FIG. 14, the data counter circuits 861 to 866 are not shown. The data counter circuits 860 to 867 monitor the values of the data D0 to D7 output from the sampler circuits 830 to 837, and transmit the information on the number of consecutive pieces of the value to the ECC circuit 14 when the identical values are consecutive. For example, when a pattern of values such as "1", "0", "0", and "0" is output as the value of the data D0 from the sampler circuit 830, the data counter circuit 860 transmits information of "1", "1", "2", and "3" as the information on the number of consecutive pieces corresponding to these values to the ECC circuit 14. Even when a pattern of values such as "0", "1", "1", and "1" is output as the data D0 from the sampler circuit 830, the data counter circuit 860 transmits information of "3" as the information on the number of consecutive pieces to the ECC circuit 14. When a pattern of values such as "1", "0", "1", and "0" is output as the data D0 from the sampler circuit 830, the data counter circuit 860 transmits information of "1", "1", "1", and "1" as the information on the number of consecutive pieces to the ECC circuit 14. The other data counter circuits 861 to 867 also operate in the same manner.

The voltage detection circuit 87 detects the voltage value of the determination voltage Vth generated by the voltage generation circuit 82, and transmits the information on the detected voltage value of the determination voltage Vth to the ECC circuit 14.

In the present embodiment, the duty ratio of the data strobe signal DQS, the number of consecutive pieces of the data D0 to D7, and the voltage value of the determination voltage Vth correspond to a parameter that affects the acquisition of the data from the data signal DQ<7:0>. In addition, the duty detection circuit 85, the data counter circuits 860 to 867, and the voltage detection circuit 87 correspond to an acquisition unit 90 that acquires the parameters.

The ECC circuit 14 executes an error detection process and an error correction process using the ECC on the data received from the semiconductor memory device 2.

Figure 15:
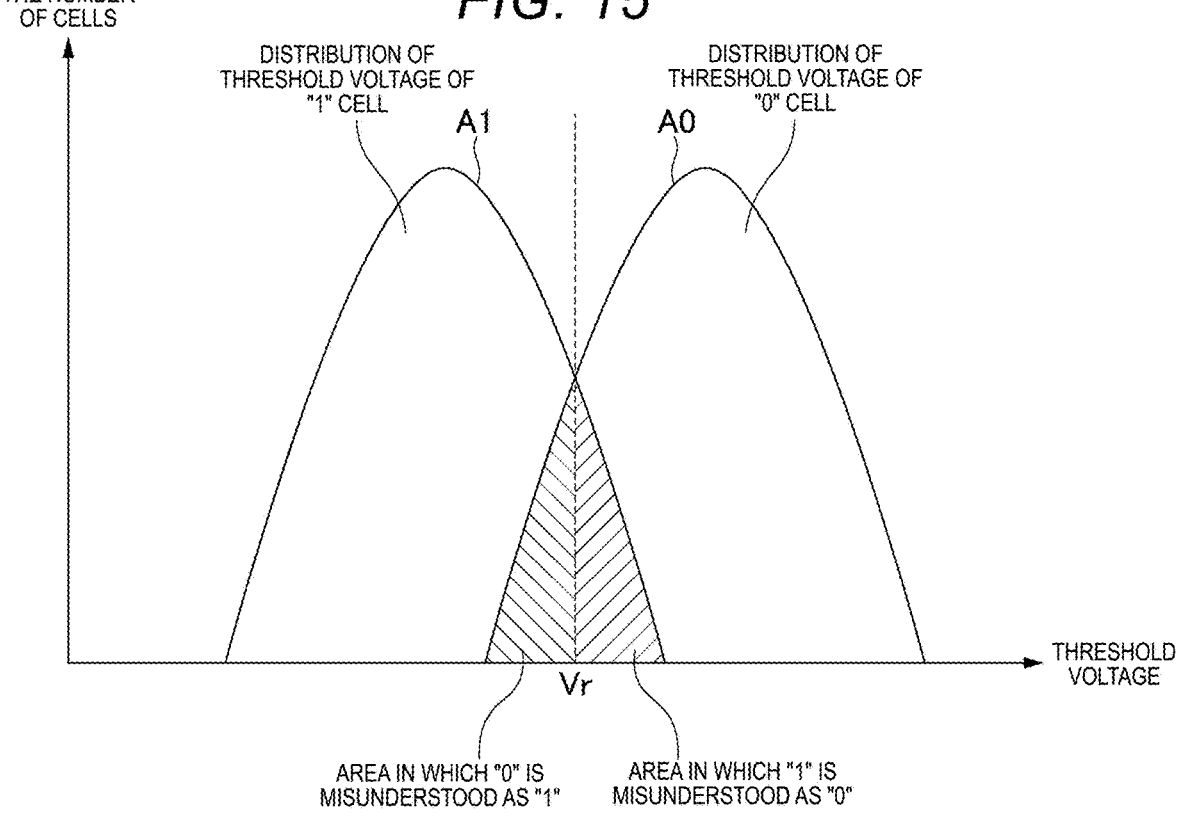
FIG. 15 is a graph showing an example of a distribution of threshold voltages of the memory cell transistor according to the embodiment.

When the semiconductor memory device 2 adopts the TLC method, actually, as shown in FIG. 15, the distribution of the threshold voltage of the memory cell transistor MT may overlap with a distribution A1 of the threshold voltage "1" and a distribution AG of the threshold voltage "0". In such a case, as shown in FIG. 15, when the center of each of the distributions A1 and AG is set as the read voltage Vr, when the data read from the memory cell transistor MT based on the read voltage Vr is "1", the probability that the data is actually "1" is, for example, 90%, and the probability that the data is actually "0" is 10%. Similarly, when the data read from the memory cell transistor MT based on the read voltage Vr is "0", the probability that the data is actually "0" is, for example, 90%, and the probability that the data is actually "1" is 10%. As described above, when the distribution of the threshold voltage of the memory cell transistor MT has the distribution as shown in FIG. 15, the data read from the semiconductor memory device 2 may include the error.

The ECC circuit 14 detects and corrects the error in the read data by executing the error detection process and the error correction process on the data read from the semiconductor memory device 2. The ECC circuit 14 executes the error detection process and the error correction process based on soft determination using the likelihood information PL indicating the certainty of "0" or "1" as the error detection process and the error correction process. As an error correction code, for example, a low-density parity-check (LDPC) code is used. As the likelihood information PL, information indicating the certainty of "0" or "1" in a percentage value is used. For example, the likelihood information PL of 100% means that the data is certainly "0" or "1". In addition, the likelihood information PL of 90% means that the probability that the data is "0" is 90% and the probability that the data is "1" is 10%, or the probability that the data is "1" is 90% and the probability that the data is "0" is 10%. It should be noted that the likelihood information PL is not limited to the percentage value, and for example, a log likelihood ratio (LLR) or the like may be used.

As shown in FIG. 14, the ECC circuit 14 includes a likelihood information storage unit 140, a likelihood information revision unit 141, a decoding unit 142, and a flash translation layer (FTL) 143. The decoding unit 142 decodes the data read from the semiconductor memory device 2 to restore the code word written into the semiconductor memory device 2. In this case, the decoding unit 142 performs the error correction on the read data based on a soft determination algorithm of the LDPC code using the likelihood information PL. The data decoded by the decoding unit 142 is transmitted to the host via the FTL 143 and the host interface 13. The FTL 143 is configured to manage the data and manage the blocks of the semiconductor memory device 2. In the present embodiment, the decoding unit 142 corresponds to an error correction unit that performs an error correction process on the data.

The likelihood information storage unit 140 stores basic likelihood information PLb, which is basic information of the likelihood information PL used in the decoding unit 142. For example, when the memory cell transistor MT of the semiconductor memory device 2 has the distribution of the threshold voltage as shown in FIG. 15, the basic likelihood information PLb is set in advance to a value of 90%, and is stored in the likelihood information storage unit 140. The basic likelihood information PLb is stored in, for example, the semiconductor memory device 2. The processor 12 of the memory controller 1 may cause the semiconductor memory device 2 to store the basic likelihood information PLb, and use the RAM 11 to cache the basic likelihood information PLb. In this case, the likelihood information storage unit 140 is implemented by the processor 12 and the RAM 11. The basic likelihood information PLb may not necessarily be stored in the semiconductor memory device 2. For example, the memory controller 1 may be configured to create the basic likelihood information PLb using the processor 12. Alternatively, for example, the memory controller 1 may be configured to externally receive the basic likelihood information PLb and/or to cause the RAM 11 to store the basic likelihood information PLb.

The likelihood information revision unit 141 revises the basic likelihood information PLb based on the information transmitted from the duty detection circuit 85, the data counter circuits 860 to 867, and the voltage detection circuit 87, and transmits the revised likelihood information PL to the decoding unit 142. The decoding unit 142 performs the error correction process by using the likelihood information PL revised by the likelihood information revision unit 141. The likelihood information revision unit 141 may be achieved by a hardware circuit, or may be achieved by the processor 12 executing firmware stored in the semiconductor memory device 2.

FIG. 16 shows an example of the revision process on the basic likelihood information PLb executed by the likelihood information revision unit 141. It should be noted that, hereinafter, a case in which the likelihood information PL of the data D0 is revised will be described as an example.

The likelihood information revision unit 141 calculates a first revision value ΔPL1 based on the information on the number of consecutive pieces of the data transmitted from the data counter circuit 860. For example, the likelihood information revision unit 141 sets a value to which a negative sign is added as the first revision value ΔPL1 for the information on the number of consecutive pieces of the data transmitted from the data counter circuit 860. For example, as the data D0, data d1 to d9 as shown in FIG. 16 are subsequently read from the semiconductor memory device 2. In this case, when the data d1 to d4 are consecutive with the "0" data, the data counter circuit 860 outputs the information of "3" as the information on the number of consecutive pieces of the data. Therefore, the likelihood information revision unit 141 sets "−3" with a negative sign as the first revision value ΔPL1 for the information on the number of consecutive pieces output from the data counter circuit 860. When the "0" data is arranged as described above, as described with reference to FIG. 12, for example, for the "0" data immediately before switching to the "1" data, there is a possibility that the "0" data is erroneously acquired regardless of the fact that the data is actually the "1" data. That is, since the certainty of the data falls, the first revision value ΔPL1 is set to a negative value in order to decrease and revise the basic likelihood information PLb. In addition, the probability of erroneously acquiring the data is higher as the number of consecutive pieces of the data is larger. Therefore, the likelihood information revision unit 141 further decreases the first revision value ΔPL1 as the number of consecutive pieces of the data is increased. It should be noted that, for example, the likelihood information revision unit 141 may set a lower limit value of the first revision value ΔPL1 to "−3".

The likelihood information revision unit 141 calculates a second revision value ΔPL2 based on the duty ratio of the data strobe signal DQS detected by the duty detection circuit 85. For example, the likelihood information revision unit 141 determines whether or not the duty ratio detected by the duty detection circuit 85 is 50%. When the duty ratio detected by the duty detection circuit 85 is not 50%, the likelihood information revision unit 141 decreases the likelihood information corresponding to the data at the deviated rising edge and/or falling edge timing. For example, when it is assumed that the rising edge timing of the data strobe signal DQS is not changed and the falling edge timing is changed, the likelihood information revision unit 141 decreases the likelihood information corresponding to the even-numbered data d2, d4, d6, and d8 among the data d1 to d9 while maintaining the likelihood information corresponding to the odd-numbered data d1, d3, d5, d7, and d9. For example, as shown in FIG. 16, the likelihood information revision unit 141 sets the second revision value ΔPL2 corresponding to the even-numbered data d2, d4, d6, and d8 to "−1".

It should be noted that the likelihood information revision unit 141 may change the method of adjusting the second revision value ΔPL2 in response to the rising edge and/or falling edge timing. For example, when it is assumed that the falling edge timing of the data strobe signal DQS is not changed and the rising edge timing is changed, the likelihood information revision unit 141 may maintain the likelihood information corresponding to the even-numbered data d2, d4, d6, and d8 among the data d1 to d9 while decreasing the likelihood information corresponding to the odd-numbered data d1, d3, d5, d7, and d9. In addition, when each of the rising edge timing and the falling edge timing of the data strobe signal DQS is changed, the likelihood information corresponding to the odd-numbered data d1, d3, d5, d7, and d9 and the likelihood information corresponding to the even-numbered data d2, d4, d6, and d8 may be decreased in response to a degree of the change. In this case, the decrease amount of the likelihood information corresponding to the odd-numbered data d1, d3, d5, d7, and d9 may be the same as or different from the decrease amount of the likelihood information corresponding to the even-numbered data d2, d4, d6, and d8.

The likelihood information revision unit 141 calculates a third revision value ΔPL3 based on the determination voltage Vth detected by the voltage detection circuit 87. For example, the likelihood information revision unit 141 determines whether or not the determination voltage Vth deviates from the reference voltage (0.6 V). When the determination voltage Vth deviates from the reference voltage, the likelihood information revision unit 141 sets the third revision value ΔPL3 based on the deviation amount.

Specifically, when the determination voltage Vth satisfies "Vth>0.6 V", the likelihood information revision unit 141 sets the third revision value ΔPL3 corresponding to the "0" data to "−1" such that the likelihood information for the "0" data is reduced. As described with reference to FIG. 13B, this is because, as the determination voltage Vth is higher, the possibility of acquiring the data of "0" is higher even though the original data is "1". On the other hand, the likelihood information revision unit 141 sets the third revision value ΔPL3 corresponding to the "1" data to "+1" such that the likelihood information for the "1" data is increased. This is because, when the data of "1" is acquired regardless of the high possibility of acquiring the data of "0", the likelihood of the data is higher than usual.

It should be noted that, when the determination voltage Vth satisfies "Vth>0.6 V", the likelihood information revision unit 141 may set the third revision value ΔPL3 corresponding to the "0" data to a negative value, and may set an absolute value of the negative value to be larger as the deviation (Vth−0.6) is larger. In addition, when the determination voltage Vth satisfies "Vth>0.6 V", the likelihood information revision unit 141 may set the third revision value ΔPL3 corresponding to the "1" data to a positive value, and may set an absolute value of the positive value to be larger as the deviation (Vth−0.6) is larger.

Further, the likelihood information revision unit 141 may further determine whether or not the determination voltage Vth satisfies "Vth<0.6V". In this case, the likelihood information revision unit 141 sets the third revision value ΔPL3 corresponding to the "0" data to a positive value, and sets an absolute value of the positive value to be larger as the deviation (0.6−Vth) is larger. In addition, the likelihood information revision unit 141 sets the third revision value ΔPL3 corresponding to the "1" data to a negative value, and sets an absolute value of the negative value to be larger as the deviation (0.6−Vth) is larger.

After the revision values ΔPL1 to ΔPL3 are calculated as described above, the likelihood information revision unit 141 calculates the post-revision likelihood information PL corresponding to each data d1 to d9 by adding the revision values ΔPL1 to ΔPL3 to the basic likelihood information PLb. For example, for the data d4, "PLb+ΔPL1+ΔPL1+ΔPL3" is calculated to "85" as the likelihood information PL corresponding to the data d4, and the calculated likelihood information PL is input to the decoding unit 142.

1.10 Actions and Effects of Memory System According to Present Embodiment

As shown in FIG. 14, the memory controller 1 according to the present embodiment includes the memory interface 15, the likelihood information storage unit 140, the acquisition unit 90, the likelihood information revision unit 141, and the decoding unit 142. The receiver circuits 730 to 737 of the memory interface 15 receive the data signal DQ<7:0> from the semiconductor memory device 2 and acquire the data D0 to D7 from the data signal DQ<7:0> during the read operation of the data from the semiconductor memory device 2. The likelihood information storage unit 140 stores the likelihood information PL of the data D0 to D7. The acquisition unit 90 acquires the parameter that affects the acquisition of the data from the data signal DQ<7:0>. The likelihood information revision unit 141 revises the likelihood information PL based on the parameter acquired by the acquisition unit 90. The decoding unit 142 performs the error correction process on the data read from the semiconductor memory device 2 based on the post-revision likelihood information PL revised by the likelihood information revision unit 141.

With this configuration, the data loss generated when acquiring the data from the data signal DQ<7:0> in the memory controller 1 can be collectively corrected by the error correction process together with the error originally included in the data stored in the semiconductor memory device 2. Therefore, it is possible to enhance the function of correcting an error included in data. In addition, as a method of preventing the data loss generated when acquiring the data from the data signal DQ<7:0>, for example, a method of separately providing a revision circuit that revises the distortion of the waveform of the data signal DQ<7:0> as shown in FIG. 12 may also be considered. However, with the above-described configuration, the data loss can be corrected without providing such a revision circuit, so that the structure can be simplified. Further, since only the likelihood information PL is revised, the calculation load of the decoding unit 142 is not increased. Moreover, the accuracy of the likelihood information PL rises, and thus it is possible to expect an improvement in the data restoration ability or the data restoration efficiency of the decoding unit 142.

The data counter circuits 860 to 867 of the acquisition unit 90 acquire the information on the continuity of the data acquired from the data signal DQ<7:0> by the memory interface 15, as the parameter that affects the acquisition of the data from the data signal DQ<7:0>. The likelihood information revision unit 141 revises the likelihood information PL when pieces of the acquired data are consecutive with the identical value. Specifically, the likelihood information revision unit 141 changes the revision amount of the likelihood information PL based on the number of consecutive pieces of the data with the identical value. For example, the likelihood information revision unit 141 revises the likelihood information PL to be larger as the number of consecutive pieces of the data with the identical value is larger. With this configuration, it is possible to more appropriately correct the error in the data caused by the distortion of the data signal DQ<7:0>.

The duty detection circuit 85 of the acquisition unit 90 detects the duty ratio of the data strobe signal DQS, as the parameter that affects the acquisition of the data from the data signal DQ<7:0>. The likelihood information revision unit 141 revises the likelihood information PL based on the duty ratio of the data strobe signal DQS. With this configuration, it is possible to more appropriately correct the error in the data caused by the change in the duty ratio of the data strobe signal DQS.

The voltage detection circuit 87 of the acquisition unit 90 acquires the information on the voltage value of the determination voltage Vth, as the parameter that affects the acquisition of the data from the data signal DQ<7:0>. The likelihood information revision unit 141 revises the likelihood information PL based on the deviation of the voltage value of the determination voltage Vth, which is acquired by the acquisition unit 90, from the reference value (for example, 0.6 V) of the determination voltage Vth. With this configuration, it is possible to more appropriately correct the error in the data caused by the variation in the determination voltage Vth.

2 Another Embodiment

The present disclosure is not limited to the above-described specific examples. For example, the duty detection circuit 85 may detect the duty ratio of the data signal DQ<7:0> instead of the data strobe signal DQS. In this case, the likelihood information revision unit 141 revises the likelihood information PL based on the duty ratio of the data signal DQ<7:0>.

Even when the voltage of the data signal DQ<7:0> at the "H" level deviates from 1.2 V or the voltage of the data signal DQ<7:0> at the "L" level deviates from 0 V, there is a possibility that erroneous data is acquired from the data signal DQ<7:0>. That is, as the parameter that affects the acquisition of the data from the data signal DQ<7:0>, a deviation of the voltage at the "H" level, a deviation of the voltage at the "L" level, and the like are also considered. Therefore, the likelihood information revision unit 141 may revise the likelihood information PL based on the deviation of the voltage value at the "H" level from the reference value, the deviation of the voltage value at the "L" level from the reference value, and the like. That is, the likelihood information revision unit 141 need only revise the likelihood information PL based on any parameter that affects the acquisition of the data from the data signal DQ<7:0>.

Figure 17:
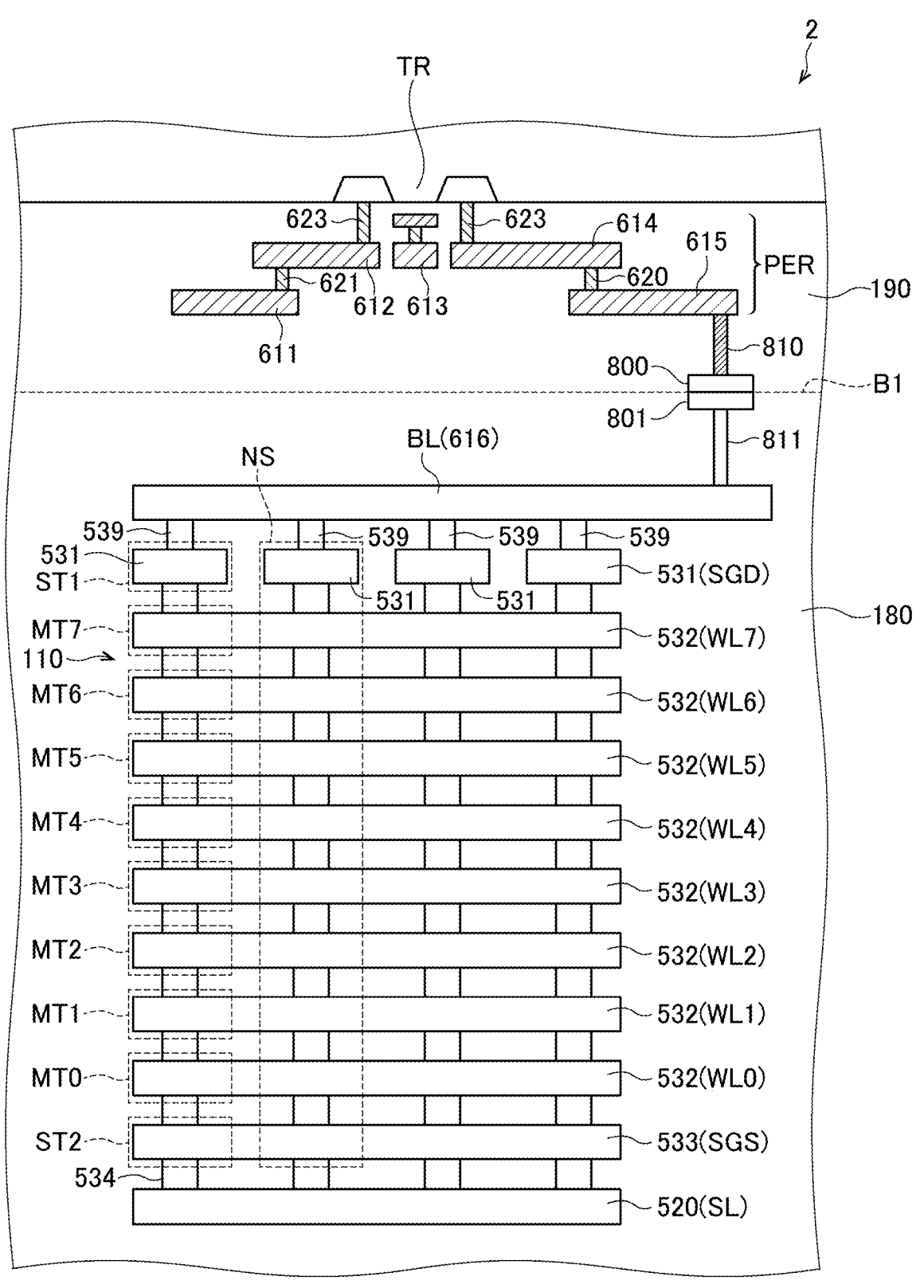
FIG. 17 is a cross-sectional view showing a cross-sectional structure of a semiconductor memory device according to another embodiment.

The semiconductor memory device 2 is not limited to the structure as shown in FIG. 7, and may have a CMOS directly bonded to array (CBA) structure as shown in FIG. 17. In the semiconductor memory device 2 shown in FIG. 17, a memory unit 180 in which a memory cell array 110 is provided, and a control circuit unit 190 in which the peripheral circuit PER is provided are manufactured separately. The semiconductor memory device 2 is formed by bonding the memory unit 180 and the control circuit unit 190, which are separately manufactured, to each other at a bonding surface B1. A bonding pad 800 of the control circuit unit 190 and a bonding pad 801 of the memory unit 180 provided on the bonding surface B1 are bonded to each other. The memory cell array 110 and the peripheral circuit PER are electrically connected to each other through the bonding pads 800 and 801 and vias 810 and 811.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A memory controller comprising:
a memory interface circuit that receives, during a read operation executed in a semiconductor memory device, a data signal from the semiconductor memory device;
a memory device; and
an error correction circuit configured to store in the memory device log likelihood ratio (LLR) values that represent a likelihood that data bits acquired from the data signal have a logical first level or a logical second level, revise the LLR values, and perform an error correction process on the data bits based on the revised LLR values, wherein:
the memory interface circuit receives a data strobe signal together with the data signal, and is configured to acquire the data bits from the data signal based on at least one timing of a rising edge or a falling edge of the data strobe signal and to determine, for each of the data bits, that the data bit has the logical first level or the logical second level by comparing a voltage level of the data signal with a determination voltage level, and the error correction circuit is configured to revise the LLR values based on a duty ratio of the data strobe signal and a deviation of the determination voltage level from a reference voltage level; and
the error correction circuit is further configured to lower the LLR value of a data bit determined to have the logical first level based on a number of preceding data bits that are continuous therewith in the data bits acquired from the data signal and determined to also have the logical first level, and to lower the LLR value of a data bit determined to have the logical second level based on a number of preceding data bits that are continuous therewith in the data bits acquired from the data signal and determined to also have the logical second level.

2. The memory controller according to claim 1, wherein the error correction circuit is further configured to revise the LLR values based on a duty ratio of the data signal.

3. A memory system comprising:
a semiconductor memory device; and
a memory controller including
a memory interface circuit that receives, during a read operation executed in the semiconductor memory device, a data signal from the semiconductor memory device,
a memory device, and
an error correction circuit configured to store in the memory device log likelihood ratio (LLR) values that represent a likelihood that data bits acquired from the data signal have a logical first level or a logical second level, revise the LLR values, and perform an error correction process on the data bits based on the revised LLR values, wherein:
the memory interface circuit receives a data strobe signal together with the data signal, and is configured to acquire the data bits from the data signal based on at least one timing of a rising edge or a falling edge of the data strobe signal and to determine, for each of the data bits, that the data bit has the logical first level or the logical second level by comparing a voltage level of the data signal with a determination voltage level, and the error correction circuit is configured to revise the LLR values based on a duty ratio of the data strobe signal and a deviation of the determination voltage level from a reference voltage level; and
the error correction circuit is further configured to lower the LLR value of a data bit determined to have the logical first level based on a number of preceding data bits that are continuous therewith in the data bits acquired from the data signal and determined to also have the logical first level, and to lower the LLR value of a data bit determined to have the logical second level based on a number of preceding data bits that are continuous therewith in the data bits acquired from the data signal and determined to also have the logical second level.

4. The memory system according to claim 3, wherein the error correction circuit is further configured to revise the LLR values based on a duty ratio of the data signal.

5. A method of performing error correction on data bits acquired from a data signal that is received by a memory interface circuit of a memory controller along with a data strobe signal, during a read operation executed in a semiconductor memory device, said method comprising:
acquiring the data bits from the data signal based on at least one timing of a rising edge or a falling edge of the data strobe signal;
determining, for each of the data bits, that the data bit has a logical first level or a logical second level by comparing a voltage level of the data signal with a determination voltage level;
storing log likelihood ratio (LLR) values that represent a likelihood that the data bits acquired from the data signal have the logical first level or the logical second level;
revising the LLR values based on a duty ratio of the data strobe signal and a deviation of the determination voltage level from a reference voltage level;
lowering the LLR value of a data bit determined to have the logical first level based on a number of preceding data bits that are continuous therewith in the data bits acquired from the data signal and determined to also have the logical first level;

lowering the LLR value of a data bit determined to have the logical second level based on a number of preceding data bits that are continuous therewith in the data bits acquired from the data signal and determined to also have the logical second level; and performing an error correction process on the data bits based on the revised LLR values.

6. The method according to claim 5, further comprising:

revising the LLR values based on a duty ratio of the data signal.

\* \* \* \* \*